United States Patent
Miekka et al.

(10) Patent No.: US 6,472,784 B2
(45) Date of Patent: Oct. 29, 2002

(54) METHODS AND APPARATUS FOR INCREASING POWER OF PERMANENT MAGNET MOTORS

(76) Inventors: Fred N. Miekka, 3210 Lombardy Rd., Pasadena, CA (US) 91107; Peter W. Mackie, 276 Grandview Ave., Sierra Madre, CA (US) 91024

(*) Notice: Subject to any disclaimer, the term of this patent is extended or adjusted under 35 U.S.C. 154(b) by 4 days.

(21) Appl. No.: 09/793,381

(22) Filed: Feb. 26, 2001

(65) Prior Publication Data

US 2002/0047346 A1 Apr. 25, 2002

Related U.S. Application Data

(63) Continuation-in-part of application No. 09/440,490, filed on Nov. 15, 1999, now Pat. No. 6,194,799, which is a division of application No. 09/088,096, filed on Jun. 1, 1998, now Pat. No. 6,037,692, which is a continuation-in-part of application No. 08/991,926, filed on Dec. 16, 1997, now Pat. No. 5,903,118.

(51) Int. Cl.[7] .................... H02K 1/00; H02K 11/00
(52) U.S. Cl. ............... 310/68 R; 310/68 B; 310/181; 310/198; 310/268; 318/439
(58) Field of Search .................. 310/67 R, 68 B, 310/68 E, 68 R, 198, 181, 268, 154, 156; 318/254, 439; 388/800, 924, 925

(56) References Cited

U.S. PATENT DOCUMENTS

| | | | |
|---|---|---|---|
| 3,686,524 A | * 8/1972 | Hall | 310/154.22 |
| 3,828,212 A | * 8/1974 | Harkness et al. | 310/153 |
| 3,974,406 A | * 8/1976 | Wehde | 310/156.26 |
| 4,015,181 A | * 3/1977 | Karube et al. | 318/439 |
| 4,458,554 A | * 7/1984 | Hrastar | 73/468 |
| 4,710,667 A | * 12/1987 | Whiteley | 310/164 |
| 5,075,606 A | * 12/1991 | Lipman | 310/63 |
| 5,123,079 A | * 6/1992 | Tanii et al. | 388/827 |
| 5,125,067 A | * 6/1992 | Erdman | 318/254 |
| 5,179,307 A | * 1/1993 | Porter | 310/156.32 |
| 5,633,545 A | * 5/1997 | Albrecht et al. | 310/156.26 |
| 5,661,351 A | * 8/1997 | von der Heide et al. | 310/156.43 |
| 5,691,681 A | * 11/1997 | Okugawa | 310/152 |
| 5,696,419 A | * 12/1997 | Rakestraw | 290/43 |

* cited by examiner

Primary Examiner—Burton S. Mullins
(74) Attorney, Agent, or Firm—Eric K. Satermo

(57) ABSTRACT

A method of increasing the power output of existing permanent magnet motors along with apparatus is disclosed. Increased power output is achieved by more completely utilizing the magnetic field of motor permanent magnets during running. The apparatus is external to the motor and therefore eliminates the need for modifications to the motor itself. The method involves providing a source of power to a permanent magnet motor which is capable of demagnetizing the motor permanent magnets at stall, and reducing the power at start up to a level sufficient to prevent demagnetization. Full power to the motor is provided when the motor speed reaches a level sufficient to prevent demagnetization of the permanent magnets.

6 Claims, 24 Drawing Sheets

FIG. 24
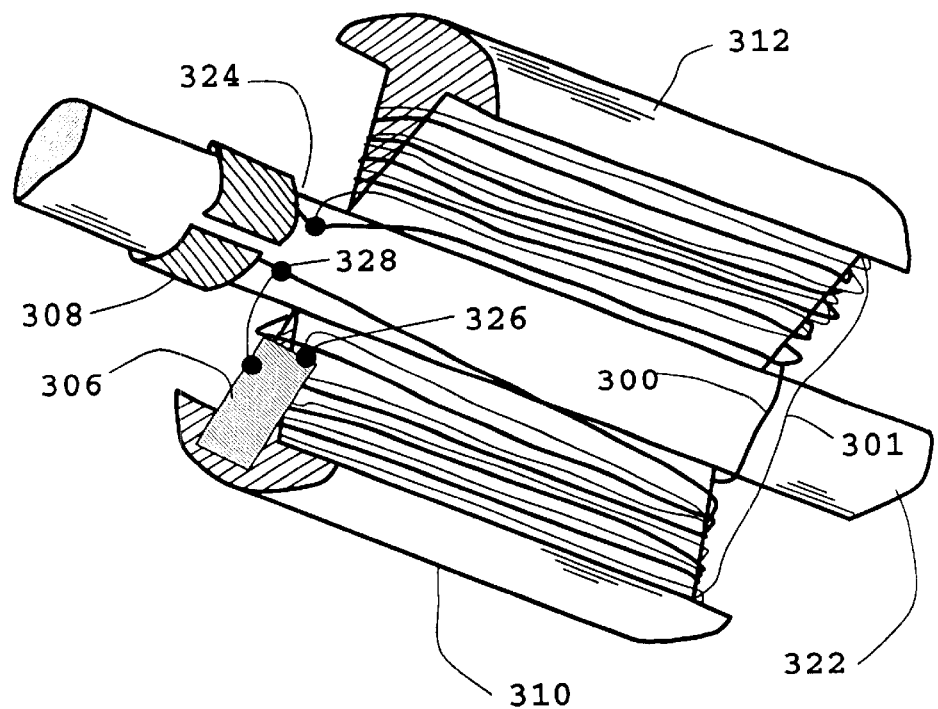
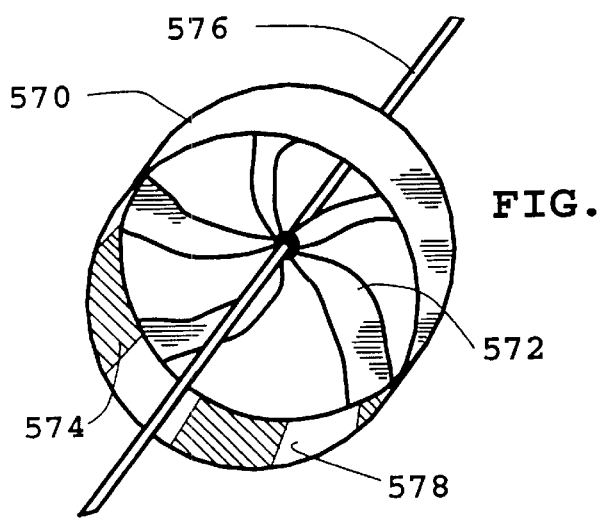
FIG. 32

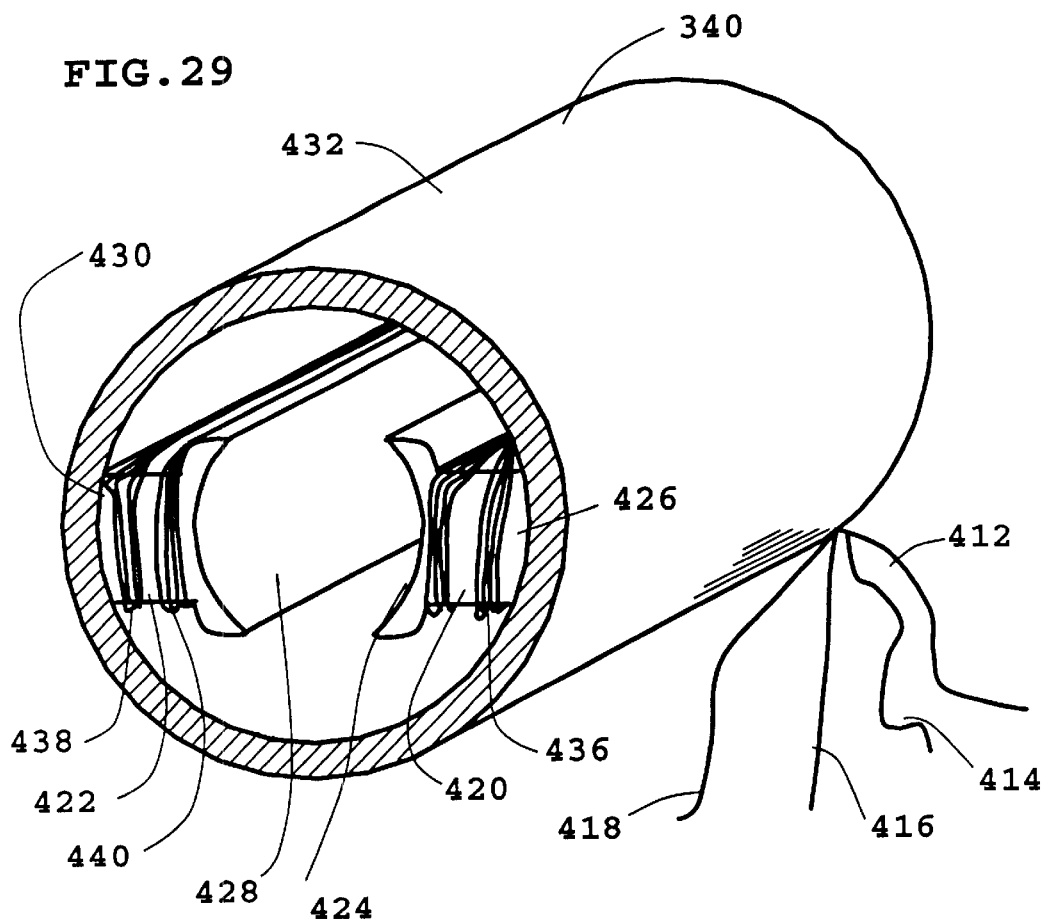
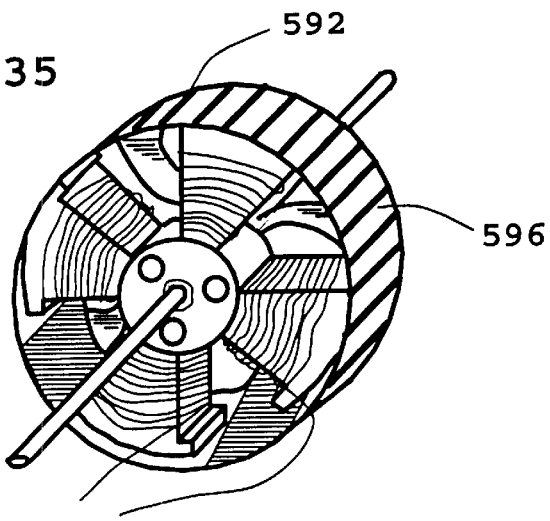

FIG.31
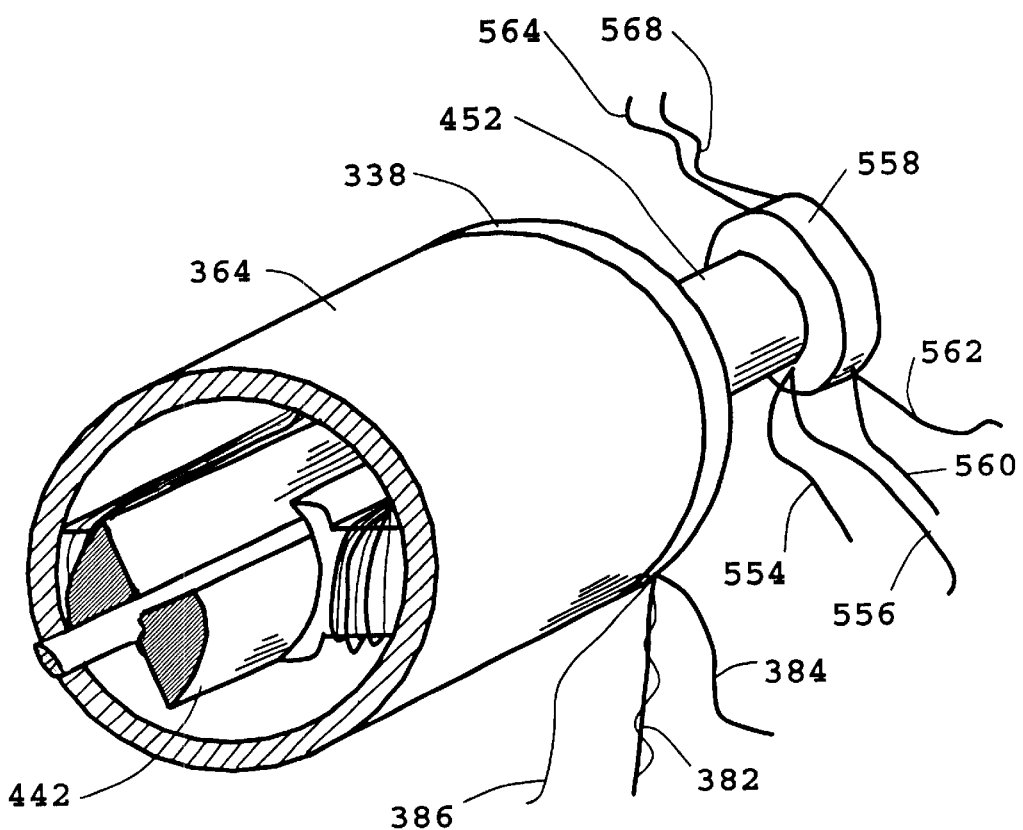
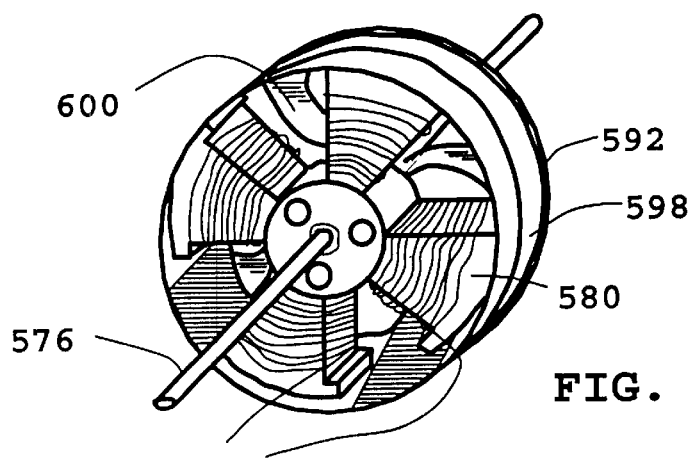
FIG. 36

METHODS AND APPARATUS FOR INCREASING POWER OF PERMANENT MAGNET MOTORS

CROSS REFERENCE TO RELATED APPLICATIONS

This application is a continuation-in-part application of U.S. patent application Ser. No. 09/440,490 filed Nov. 15, 1999, now U.S. Pat. No. 6,194,799 issued Feb. 27, 2001, which application is divisional application of U.S. patent application Ser. No. 09/088,096 filed Jun. 1, 1998, now U.S. Pat. No. 6,037,692 on Mar. 14, 2000, which application is a continuation-in-part application of U.S. patent application Ser. No. 08/991,926 filed Dec. 16, 1997, now U.S. Pat. No. 5,903,118, issued May 11, 1999.

BACKGROUND OF THE INVENTION

1. Field of the Invention

The present invention relates to electric motors and, more particularly, to direct current electric motors suitable for reliably and efficiently powering electric vehicles and industrial machinery.

2. Description of Related Art

There are numerous electric motors available for propelling electric automobiles. These include both direct current (DC) motors designed to drive directly off of the batteries and alternating current (AC) motors which require electrical circuitry for converting the DC power in the batteries to AC power. The most efficient of these AC motors requires three or more phase power.

Such motors have a high power-to-weight ratio, can be made to run efficiently, and are inherently reliable because of their brushless design. A disadvantage of such motors is the fact that the battery power must be first converted to AC before it can be used by the motor. This disadvantage shows up in the need for complex circuitry. This is especially true for AC motors having three or more phases. Along with the need for complex circuitry is the fact that the failure of even a single electrical component in the system can result in total failure of the drive circuitry for producing AC power. This results in DC electric power in the batteries, and a motor that requires AC power. This renders the entire drive system useless.

Therefore, such drive systems suffer from the potential of leaving the driver stranded. Despite these obstacles, companies such as AC Propulsion Inc. have made considerable advances in the use of AC motors in electric cars. In particular, high power to weight ratios have been achieved.

In the powering of industrial machinery, in many applications it is desirable to have an electric motor that has considerable amounts of torque and power at relatively low RPM values. This is normally achieved by gearing the motor down, however this practice results in added moving parts, increased mechanical losses, and adds cost and complexity to the overall system. In general DC electric motors have good torque characteristics which make them ideal for use in many industrial applications. In general with DC electric motors, the more mechanical drag on the motor, the more torque is produced. In this respect such motors are ideal for propelling electric cars as well. This is especially true if one wants to drive the wheels of such a vehicle directly by employing a motor in the wheel hub. There are several reasons why DC electric motors are advantageous.

DC electric motors require little circuitry to drive them from batteries. In some cases they can be wired directly with only a switch to turn the system on and off. Another advantage offered by DC electric motors is the fact that such motors do not require starting circuitry in the way that many AC motors do.

The first electric cars were produced at the turn of the century and were powered by DC electric motors. Such motors utilized two sets of electromagnets to produce their torque. One set was mounted to the inside of the motor casing. These electromagnets had one set of poles facing inward, and the other set of poles against the steel casing to magnetically connect them in series. The motor casing with its electromagnets made up the stator portion of the motor. When power was on, these electromagnets maintained the same field. At each end of the motor casing were end caps having holes which were centrally located which supported a bushing or bearing through which the rotational portion (or rotor) was supported. The rotor consisted of a round shaft having a larger diameter set of electromagnet windings wound onto an iron core. The ends of the rotor windings were fixed to conductive copper strips that were insulated from each other and the motor casing using resin or other suitable insulating material. A set of brushes which were usually made of graphite pushed up against the copper strips in the rotor to make electrical contact while also allowing the rotor to rotate. The position of the brushes relative to the stator electromagnet windings was always set so that the proper rotor electromagnets were turned on at the appropriate times by the brushes to always magnetically drive the rotor in the same direction (i.e., by interaction of the stator magnetic field with the magnetic field of the electromagnets in the rotor).

While these motors were suitable for powering both electric cars, as well as industrial equipment, Their efficiency was somewhat limited by the fact that power losses occurred in both sets of electromagnets due to the resistance of their windings.

In the early 1930s, the General Electric Company developed the first permanent magnets that were strong enough to replace one set of electromagnet windings in DC motors. This Permanent magnet material was called Alnico, and soon several grades were made commercially available. Shortly thereafter, the first useful permanent magnet motors began to appear. These is motors basically used permanent magnets to replace the stator electromagnets. While these motors had an increased efficiency when compared to their predecessors, they suffered from the possibility of demagnetization of the permanent magnets if the electromagnetic field in the rotor exceeded the "coercive force" (a measure of the resistance to demagnetization of permanent magnets) of the permanent magnets in the stator. To partially alleviate this problem, stronger ceramic permanent magnets were developed, and still stronger magnets called "Rare Earth Magnets" are among the most recent developments.

All DC permanent magnet motors run the risk of demagnetization of their permanent magnets if the electromagnetic field of the windings exceed the coercive force of the permanent magnets. To alleviate this problem, a maximum safe operating voltage for any DC permanent magnet motor is specified which under maximum power conditions (i.e., at stall) the resistance of the electromagnet windings will be high enough to prevent a flow of current through the electromagnet sufficient to cause irreversible damage to the permanent magnets. This current is considerably greater than the normal operating current, and for this reason, normal operating conditions for traditional permanent magnet DC electric motors only utilize a fraction of their true power capabilities based on their permanent magnets. In fact, most of these motors only utilize between 10% and 25% of their true potential.

The wire diameter used in winding an electromagnet core basically determines the magnetization force in ampere-turns for a given cross-sectional core diameter at a given voltage. Increasing the number of turns reduces the number of amperes that will flow through the coil, but increases the number of turns thus, maintaining the same number of ampere-turns. In order to more effectively use the permanent magnets of a permanent magnet motor under normal running conditions (i.e., at 10% to 25% of stall current) electromagnet windings must be activated that are more than capable of demagnetizing the permanent magnets in the motor under the conditions of stall. One way to accomplish this is to wind the electromagnet in layers and using thinner wire successively in the outer layers. On start up, all the layers of wire in the electromagnet are used. The resistance of the thinner outer wire prevents excessive currents in the motor thus preventing demagnetization of the motor permanent magnets. Once the motor RPM value reaches a safe level, the outer layers are shunted, thus increasing ampere turns in the motor and increasing the utilization of the motor permanent magnets. An interlock is also provided that prevents accidental activation of the shunt mechanism under stall or low RPM conditions. Other methods may be employed to wind electromagnet cores providing this type of electromagnet. Also included is twisting two or more strands of a given thickness insulated electromagnet wire together and winding the core. At one end the two strands are connected. This becomes the common. At the other end, the two leads are kept separate. On motor start up, only one lead is connected. Once motor RPM values reach a safe level, the second lead is connected to the first thereby increasing the utilization of the permanent magnets by providing more ampere-turns in the motor electromagnet assembly.

This increased utilization of permanent magnets during running conditions results in an electric motor having exceptionally high torque values. The example outlined below will be used to further illustrate this point.

Ametek Corporation is a major manufacturer of electric motors. They manufacture a DC permanent magnet motor which is nominally rated at 24 volts. # 116281-00. It is reversible and has a no load speed of 980 RPM. Measurement of the armature resistance under stall conditions gives 2.4 ohms. According to the manufacturers specifications, it is desirable to run this motor at 750 RPM. This value represents about 25% of stall torque at 24 volts input. Under these conditions, 2.75 amperes of current flow through the motor windings. The voltage drop is equal to the Resistance in ohms times the current in amperes. This is equal to 2.4 ohms×2.75 amperes =6.6 volts. This leaves 17.4 volts for contributing to mechanical work giving the motor an efficiency of about 73%. The mechanical output when using this motor under the manufacturers recommended voltage, torque, and RPM values is 2.75 amperes×24 volts×0.73 efficiency factor to give 48 watts or about 0.063 horsepower. Running under the conditions of less torque increases motor efficiency however is detrimental to power output. Loading down the motor to increase torque has the effect of trading torque for RPM which results in virtually no increase in mechanical work output accompanied by a rapid increase in power losses in the motor windings.

Accordingly, The manufacturer also provided the maximum current before demagnetization occurs in the motor. This occurs at a current of 20 amperes through the windings. Note the fact that up to 20 amperes can be delivered to the motor before damaging the permanent magnets, but the manufacturer also specifies the best load value to run the motor at is 2.75 amperes. Therefore during normal running conditions, only 13.7% of the capability of the permanent magnets are utilized. This indicates that under the proper conditions that this motor can put out 7.3 times this torque value at this RPM value before demagnetizing the stator permanent magnets.

As is, this motor can withstand 20 amperes through its electromagnet windings before demagnetization effects destroy the stator permanent magnets. With an armature resistance of 2.4 ohms (measured at stall) this gives a maximum safe operating voltage of 48 volts without the risk of damaging the stator permanent magnets. Of course other factors need to be considered before exceeding the manufacturers specifications, but this electric motor can handle stall at 48 volts before demagnetizing the stator permanent magnets. This gives a power rating considerably higher than the original manufacturers specifications. If one wants to run this particular motor at 48 volts and at 25% of stall torque (Maximum mechanical work output before excessive voltage drops across the windings occur) at 48 volts, and about 5 amperes, 240 watts of power will be delivered to the motor at 1,500 RPM with an approximate efficiency of 75%, producing 180 watts of mechanical work and 60 watts of waste heat being generated in the motor windings. In this case the permanent magnet utilization during running is 25% of their true capability. If one wants to increase the torque output at this RPM value, it is necessary to further utilize the stator permanent magnets during running. This can be accomplished using motor windings in the armature that are more than capable of demagnetizing the stator permanent magnets under stall conditions, and not fully activating these windings until the motor RPM reaches a safe value that will not demagnetize the stator permanent magnets. The following theoretical analysis will illustrate this point.

An arbitrary number of 100 turns is chosen for the wire that wraps the electromagnet core. This gives a value of 2,000 ampere-turns before demagnetization occurs. A wire diameter is chosen to wrap the electromagnet rotor core that is half the resistance of the original wire. If the same number of turns are used, (100) an armature resistance of 1.2 ohms would be the result.

Since the same number of turns is used, if 48 volts is applied to the armature windings under stall conditions, 4,000 ampere-turns would result. Twice the magnetic field needed to demagnetize a the stator permanent magnets (assuming that core saturation effects are negligible). Now this particular motor as is would not be suitable for running at 48 volts because if even 50% of stall torque is achieved, the stator permanent magnets will be at least partially demagnetized. A second set of electromagnet windings is employed in series with the first set of windings using wire of three times the electrical resistance as the first original set. This set of windings is then wound with the same number of turns (100) as the first set giving a resistance of 3.6 ohms. The total resistance of the two windings combined is 4.8 ohms. Since the electromagnet core has twice the number of original turns, (200) in terms of demagnetization (2000 ampere-turns) this motor would have a safe operating current of 10 amperes. With an armature resistance of 4.8 ohms, a maximum operating voltage of 48 volts can be employed under the conditions of stall without demagnetizing the stator permanent magnets.

Now assume that at start up, this particular motor is connected to a 48 volt power source.

At start up, all of the windings are activated causing a current of 10 amperes to flow. 2,000 ampere-turns results in the electromagnet which is just shy of the magnetic field needed to demagnetize the stator permanent magnets. The rotor under this strong magnetic field starts to spin rapidly, and the current along with its associated magnetic field starts to weaken. At some RPM value, it is now safe to shunt out the outer high resistance turns of wire thus activating only the lower resistance inner turns. Since 25% of stall current is the desired operating range, and the rotor electromagnets have the same number of turns as the original motor, at 1,500 RPM the motor efficiency is 75%, but the torque is twice the value as the original motor, and the permanent magnets are being utilized at 50% instead of 25%. This motor is now putting out twice the power as it was originally. 480 watts of input power is providing 360 watts of mechanical work accompanied by 120 watts of waste heat. This method of increasing the power output of permanent magnet motors is quite effective. This process however needs to be made user friendly. This requires that the end user of such motors does not have to think about damaging such motors by fully activating the lower resistance motor windings. In order to accomplish this end, interlocking circuitry is needed in order to prevent the accidental demagnetization of permanent magnets in these permanent magnet motors.

Another example of how this approach can yield positive results would be to employ the thick inner windings of the previous example with its thinner associated outer windings, but only run the motor at 12.5% of stall instead of 25% of stall. In this way, this electric motor would utilize the permanent magnets by only 25%, the same utilization as the original motor without these modified windings. The motor efficiency, however would be significantly improved from about 75% to 88%. As now the thicker electromagnet windings would have less resistive losses. Of course the same precautions to guard against demagnetizing the permanent magnets would have to be taken.

In these particular cases, the connections to the electromagnet windings are difficult to achieve because the electromagnet is embedded into the rotary part of the motor. Not that this cannot be achieved, it can, in at least two different ways.

In the first method, two different and complete sets of both brushes and commutators may be employed. This is not a preferred method of implementing the high magnetic utilization aspects of this invention. Brushes and commutators are a major source of motor wear and maintenance problems. Adding on another set would add complication and increase the overall need for motor maintenance. A better approach would be to employ an internal centrifugal switch that switched the motor windings only when the RPM value reached a safe level. Such switches are commonly used to lock out motor starter windings in many single phase AC induction motors. Although two methods of using this system are described above, it is far easier implemented in DC permanent magnet motors of brushless design. In such electric motors, the electromagnets make up the stationary part of the motor or stator, and the permanent magnets make up the rotating portion of the motor or rotor.

Brushless DC electric motors are permanent magnet motors which employ their permanent magnets into the rotating portion (rotor) of the motor and their electromagnets into the stationary portion (stator) of the motor. This results in a design which is inverted from traditional permanent magnet motors. Because the electromagnets used in such motors are stationary, no electrical power needs to be provided to any moving parts. This elimination of brush timed commutators is accomplished by switching arrangements which are comprised of a rotor position sensor and transistor switching circuitry. Several methods may be employed for sensing rotor position including Hall effect sensors, and photocell gates. Transistor switching circuitry usually consists of transistors for the actual switching of power to the stationary electromagnets along with diode protecting circuitry which protects the transistors from transient back voltage spikes that are often associated with the rapid switching of electromagnets.

Another alternative is to construct a DC permanent magnet motor having the permanent magnets in the rotor and the electromagnets in the stator as is done with brushless designs but use a brush system for timing. The timing signal is then amplified electronically using transistors. This eliminates many of the problems in brush timed motors by significantly reducing the power that flows through the brush commutator system. This allows the brushes to be made from such materials as conductive kapton polyimide film, and also for the use of commutators made from copper clad circuit board material. With this type of hybrid brush timing system, keeping the inverted design features normally found in brushless motors is beneficial when employing multiple winding electromagnets.

Brushless permanent magnet motors are ideal for increasing permanent magnet utilization during running by employing the teachings of this invention. With the electromagnets in the stator instead of the rotor, the use of multiple electromagnet windings is easily achieved. In addition since the switching of the electromagnets is now achieved using electrical switching circuitry, interlocking of the individual electromagnet windings becomes a relatively easy task to perform. Speed sensing is critical as it is now used as a determining factor in the interlocking of various electromagnet winding configurations. This serves the all important function of protecting the permanent magnets from accidental demagnetization. Several speed sensing and interlocking approaches may be used. For example, for relatively large motors, a small electric generator may be placed onto the power output shaft of the motor and wired to a relay which closes the appropriate contacts at a predetermined generator output voltage. This system is a good choice because if any of the speed sensing components fail, the high power electromagnet windings are interlocked out and the motor while not being able to go into the high power mode will not be damaged by the accidental premature activation of these high power electromagnet windings. Another similar option for speed sensing is to place a small coil of wire on a ferromagnetic core which is placed close enough to the permanent magnet rotor to generate an output voltage which is proportional to speed. This sensor then becomes the electromagnet portion of a permanent magnet generator which uses the rotating rotor permanent magnets as its own.

According to another aspect of this invention a high power DC electric motor which is suitable for powering electric automobiles as well as industrial machinery is provided. This particular electric motor describes the use of a large diameter planar rotor employing built in air moving vanes to provide cooling to stator electromagnets.

All electric motors have resistive losses in their electromagnet windings which generate considerable amounts of heat. Because of this generation of heat, many motors both AC and DC, are equipped with a small fan blade mounted onto the motor shaft on the inside of the motor to move air through the motor for the purposes of cooling. In the case of DC motors, the greatest amount of heat is generated under high load conditions. Because of this fact, coupled with the fact that under such conditions motor RPM values are low, insufficient volumes of air are available to adequately cool the motor. This leads to the undesirable risk of overheating the motor under heavy load conditions. Because of this, it is often practice to mount an external fan powered by a separate power source to continuously blow high volumes of air through the motor. Although efficient for motor cooling under low RPM heavy load conditions, the extra fan motor adds to the complication of the system.

In addition to the overheating issue, the overall power of DC permanent magnet motors is proportional to the amount of permanent magnet material that can be magnetically cycled through the field produced by the electromagnets. To achieve a high rate of magnetic cycling at relatively low RPM values, employing a large diameter rotor is beneficial.

Increasing the rotor diameter increases the surface speed at the edge allowing a high volume of airflow to be easily achieved by adding air moving surfaces about the periphery. This airflow is needed to cool the motor. For high power output applications, further cooling may be necessary. Blades, rotary vanes, or even an internal turbofan can be added to achieve this.

Several electromagnet to permanent magnet geometries may be employed. For example, the permanent magnets may be placed facing outward in a radial configuration at the periphery of a large diameter disc. With this permanent magnet configuration, the electromagnets are placed around the periphery with their poles facing inward in a radial direction. In this particular situation, rotary vanes could be added around the periphery on the top side and/or the bottom side of the permanent magnets for the purposes of moving air over the exposed top and bottom surfaces of the electromagnets in the stator. Another possibility is to use a star shaped electromagnet in the center, and use a ring of permanent magnets that travels on the outside periphery of the centrally located electromagnets. In this configuration it is best practice to employ a central turbofan design to the rotary portion which pumps air over the central windings from top to bottom. Another geometry which can be employed is to place the permanent magnets into the periphery portion of a large diameter flat disc with their direction of magnetization transversing through the disc. The desired No electromagnet shape in this particular situation is one that forms the shape of a "C" and straddles the periphery of the disc with the permanent magnets traveling through the slot. In this case, air moving vanes can be added which protrude radially past the periphery of the disc to move air within the channel of the electromagnets to provide adequate cooling. One particularly interesting approach to utilizing air cooling with this particular motor geometry is to fasten flexible plastic film vanes to the periphery of the disc. These plastic strips are initially made to protrude from the edge in a radial direction. These flexible plastic strips move modest quantities of air past the electromagnets under low RPM conditions. As the rotor velocity increases, aerodynamic drag bends these strips back. This alters their shape, reducing their drag effect on the rotor, however, enough airflow is still maintained to prevent overheating of the electromagnets.

In addition to permanent magnet motors, the large diameter planar rotor geometries employing added air moving surfaces are also suited for use in "Switch Reluctance" motors. Switch reluctance motors are electric motors of brushless design where a non-magnetizable material having a high permeability is employed in the rotor in place of the permanent magnets. These materials include silicon steel, soft iron, magnetically soft ferrite, and others. Such materials become magnetic only when they are in the presence of an externally applied field. The familiar magnetic attraction between a permanent magnet and steel is an example of the principle utilized in switch reluctance motors. In such motors, only attractive forces are generated. Because of this, the switching sequence as well as the spacing of the high permeability material in the rotor is somewhat different from that which is employed in brushless electric motors having permanent magnets. Switch reluctance magnetic attraction works because while the non-magnetizable high permeability material is in the field, it becomes a temporary magnet with induced magnetic poles. Materials having high magnetic permeability lower the overall field energy of the electromagnets by completing their magnetic circuit. This field energy shows up as mechanical work. Although the risk of demagnetization is alleviated in switch reluctance motors, large voltage spikes are produced during electromagnet switching. These spikes represent large amounts of energy which can damage circuit components, create excess heat, and negatively affect motor efficiency. To alleviate this problem, high frequency chopped DC power, or even AC power can be supplied to the electromagnets where the cycle to rate is considerably higher than the motor timing switching rate. In other words, during single electromagnet on times, multiple electric pulses occur.

With all of these planar rotor geometries, high surface speeds around the periphery of the rotor are easily achieved along with considerable forces in a radial direction during running. As an example, a 24" diameter rotor rotating at 3,000 RPM will have a surface speed at the edge of about 200 miles per hour. With 5 pounds of permanent magnets around the periphery, in addition to a couple of pounds of other materials, about 27,000 pounds of centrifugal force would be present in a radial direction. Because of these radial forces, strong materials need to be used in the fabrication of the rotary portions of these large diameter planar rotors.

One solution is to employ composite materials such as carbon fiber. These materials are strong and lightweight. They do not easily conduct electricity like metals and therefore would not contribute to inductive losses. With some rotor permanent magnet geometries flat steel sections can be sandwiched on both sides by permanent magnets. With other permanent magnet rotor geometries, a steel band can be used for the purposes of holding the permanent magnets in place as well as magnetically connecting them in series with each other for the purposes of concentrating their magnetic flux to the desired area of the motor. Although steel is normally not a good choice due to its electrical and magnetic properties, when sandwiched between two permanent magnets or employed outside of the directly applied magnetic field of the electromagnets, it will somewhat resist the losses normally present when solid steel is subjected to rapidly changing magnetic fields. In this respect the steel used under these conditions behaves to in a similar manner to the steel casing in ordinary DC electric motors. It becomes part of the magnetic circuit, however being somewhat shielded from changing magnetic fields, does not appreciably add either to inductive or hysteresis loss. For example, a hub drive system for one or more wheels in an electric vehicle can be easily employed using a steel wheel rim having permanent magnets mounted against the inside portion. The permanent magnets are placed next to each other on the inside of this rim having opposite polarity. The steel in the rim then magnetically connects these permanent magnets in series. A star shaped electromagnet is mounted in the center and bolted onto the vehicle frame. The rim portion of such a wheel is mounted to the hub portion using large structurally strong air moving spokes which provide air cooling by pumping air over the electromagnet assembly while the vehicle is in motion. This hub drive system has no gears, and therefore attaining high torque values becomes critical. In achieving this end, utilizing electromagnet windings which are capable of demagnetizing the rotor permanent magnets at stall and interlocking may be of benefit. This particular open motor design provides cooling, however such open motor designs must be made somewhat resistant to the elements.

As mentioned earlier depending on motor geometry, it may be desirable to move air by employing a turbofan as the central portion of the planar rotor. This works well when the star shaped electromagnet geometry is used in the center of the motor with the rotor permanent magnets rotating around the periphery of the centrally located stationary electromagnets. It is desirable that such a turbofan is capable of moving large volumes of air over the electromagnets while running at relatively low RPM values. An example of such a turbofan is outlined in U.S. Pat. No. 5,075,606 by Leonard H. Lipman in which the author uses this turbofan design to move large volumes of air at low RPM values by maximizing the available cross section. The impeller portions of such a turbofan are ideal for cooling the large-diameter DC permanent magnet motor of this invention having the above described geometry.

In view of the foregoing, it is an object of this invention to provide methods and apparatus for increasing power of permanent magnet motors.

SUMMARY OF THE INVENTION

In summary, the present invention provides a method for increasing the power output of permanent magnet motors. A power supply capable of demagnetizing motor permanent magnets is power limited to a safe level sufficient to prevent demagnetization on motor start up. Speed and/or current sensing circuitry activates full power to the motor when conditions such as speed and current reach a level sufficient to prevent demagnetization.

BRIEF DESCRIPTION OF THE DRAWINGS

FIG. 24 shows the rotary portion of a brush timed permanent magnet motor having added windings which are made from thicker wire than the first set along with a centrifugal switch.

FIG. 29 shows the stationary electromagnet portion of a typical brushless permanent magnet DC electric motor employing two sets of electromagnet windings which are electrically isolated from each other.

FIG. 31 shows a typical DC brushless electric motor employing added electromagnet windings which are made from thicker wire than the first set along with an interlock mechanism.

FIG. 32 shows the rotary portion of a large diameter brushless DC electric motor consisting of a central turbofan portion and permanent magnets around the periphery.

FIG. 35 shows a large diameter brushless DC electric motor having a rotary portion consisting of a central turbofan and permanent magnets around the periphery, a centrally located star shaped electromagnet, and teeth for engagement to a cog belt around the outside periphery.

FIG. 36 shows a large diameter air cooled electric motor of this invention employed in a vehicle hub drive system having a steel rim, permanent magnets attached to the inside portion, a star shed electromagnet assembly which is bolted onto the vehicle frame, and large structural air moving spokes for connecting the outer rim portion to an axle assembly.

DESCRIPTION OF THE INVENTION

Figure 1:
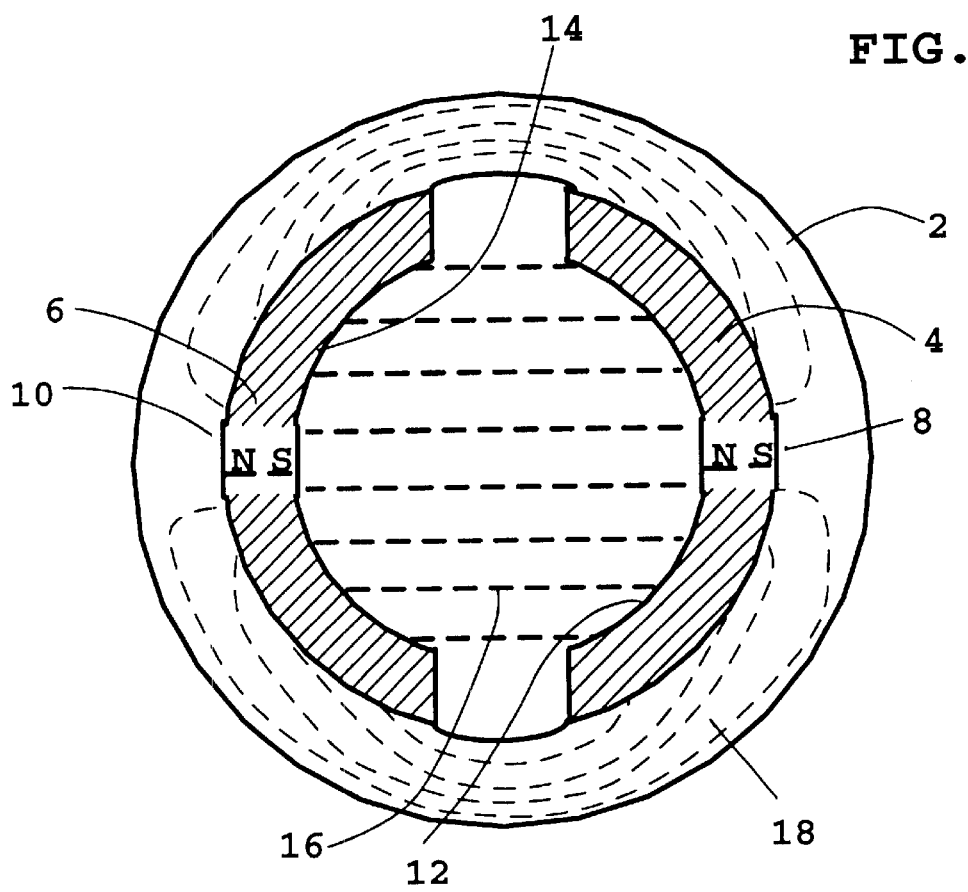
FIG. 1 shows the magnetic flux paths in the stator assembly of a brush timed permanent magnet DC electric motor.

FIG. 1 shows the open magnetic circuit in the stator portion of a traditional permanent magnet DC motor. Encased in thick steel housing 2 are permanent magnets 4 and 6 having opposite poles 8 and 10 against housing 2. Also shown are permanent magnet poles 12 and 14 which are aligned with each other across air gap 16. Also shown are lines of magnetic flux 18 which travel both through the motor housing 2 as well as through air gap 16. Thus, the completion of flux lines 18 from permanent magnets 4 and 6 requires a thick magnetic motor housing 2 as part of the magnetic circuit.

Figure 2:
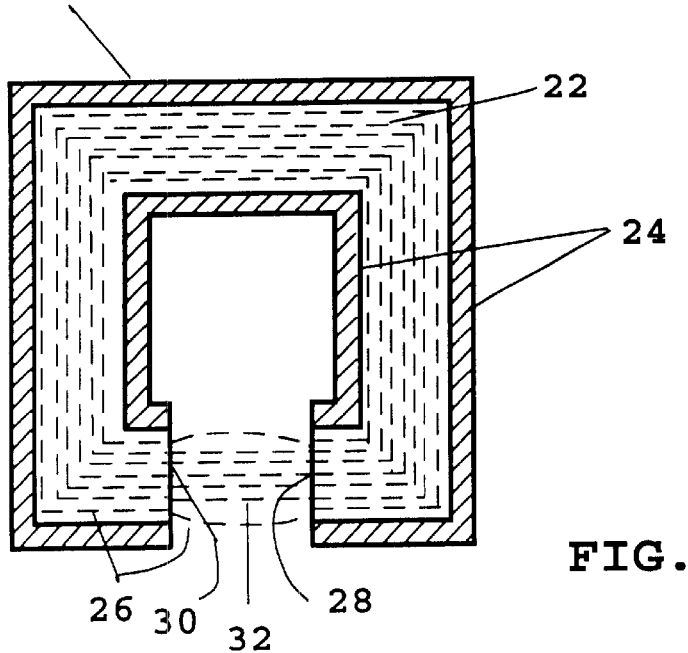
FIG. 2 shows the magnetic flux path of one of the stator electromagnet assemblies of this invention.

FIG. 2 shows the flux path produced by stator electromagnet 20 in the electric motor of this invention. Stator electromagnet 20 consists of a magnetic core 22 in the shape of a "C" which is wound with electromagnet wire 24. When electromagnet windings 24 are energized, magnetic flux 26 is generated in accordance with the right-hand rule of electrically induced magnetism. The magnetic flux 26 that is generated is contained within core 22 and emerges from pole faces 28 and 30. With the electromagnet geometry shown in FIG. 2, the magnet flux generated remains entirely within air gap 32 of the electromagnet 20. The electromagnet geometry of this invention is based on a Rowland ring. A Rowland ring was named after J. H. Rowland who made use of it in his experimental work on electricity and magnetism. A Rowland ring consists of a torroidal coil of wire wrapped around an iron core. The unique property of a Rowland ring is that the magnetic flux generated is confirmed wholly to the core. The electromagnet design shown in FIG. 2 is a Rowland ring which has been modified into an electromagnet by removing a section to produce an air gap having opposite magnet poles on each side.

Figure 3:
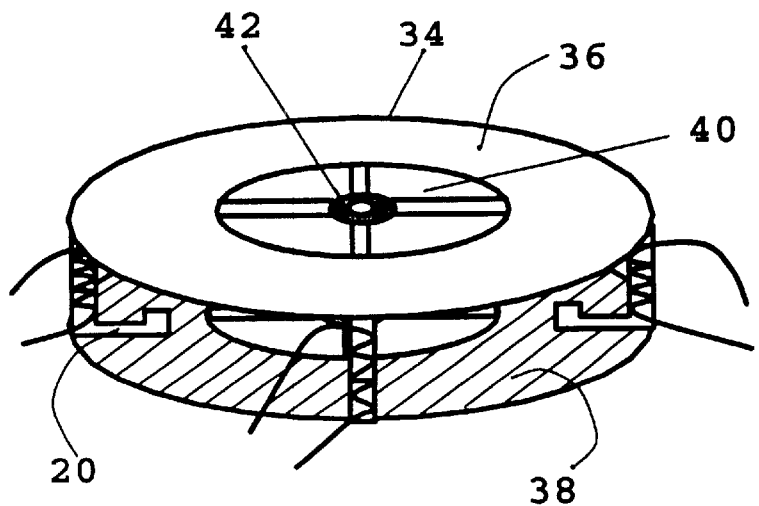
FIG. 3 shows a detailed drawing of the stator portion of the motor of this invention.

FIG. 3 shows the stator portion 34 of the high powered air cooled DC motor of this invention. Several electromagnets 20 are mechanically fastened to end plates 36 and 38. Also shown is an opening 40 in end plate 36 which allows air to flow through the motor for the purposes of cooling. Also shown is a bearing 42 for the purposes of providing a mechanical surface for supporting the rotatable motor shaft of the rotor portion.

Figure 4:
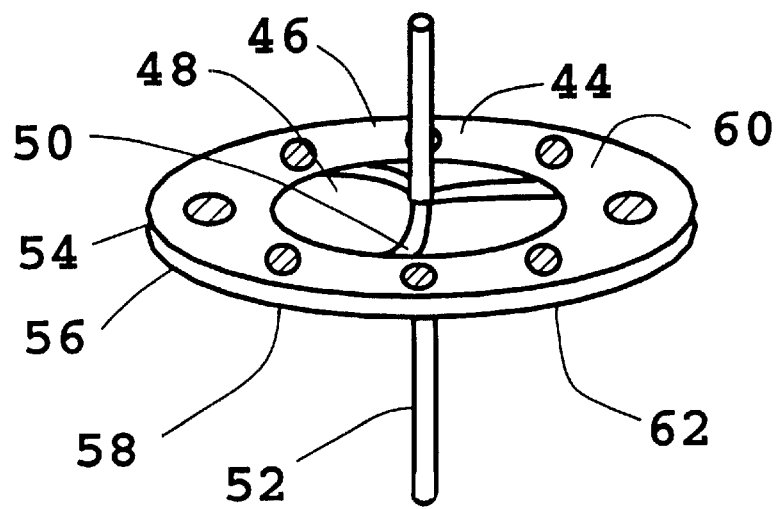
FIG. 4 shows the rotary disc portion of the motor of this invention with built in impeller.

FIG. 4 shows the rotary disc portion of the motor of this invention 44 which consists of an outer portion 46 and an inner turbofan portion 48. Inner turbofan portion 48 consists of individual blades 50 connecting a central axle 52 to edge portion 46. Edge portion 46 has several permanent magnets 54 mounted having their magnetic pole faces 56 and 58 on opposite sides 60 and 62 of outer disc portion 46.

Figure 5:
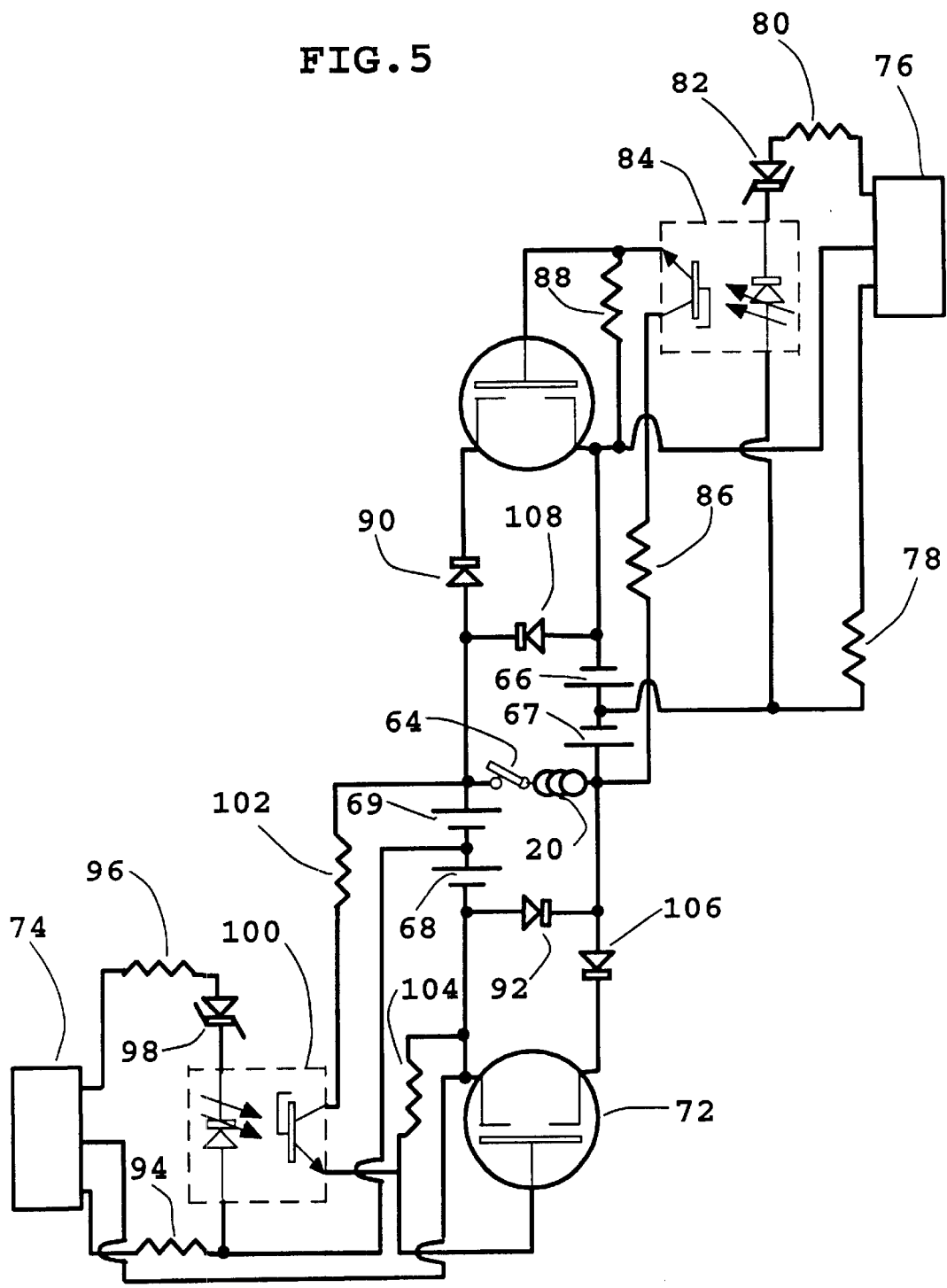
FIG. 5 shows a diagram of circuitry needed to drive the high-powered DC turbofan cooled motor of this invention.

FIG. 5 shows a circuit diagram for properly timing and supplying power to the stator electromagnets of this invention in order to drive the rotor. The circuit serves to initially energize the coil of electromagnet 20 in one direction to pull an adjacent permanent magnet into the field of the electromagnet, and then reverses the energization applied to coil 24 to push the permanent magnet out of the electromagnet 20 and to pull the next permanent magnet forward. When permanent magnet 54 passes the Hall effect sensor 76, power from battery 66 flows through resistors 78 and 80 and Zener diode 82 to activate opto-isolator 84. The phototransistor portion of opto-isolator 84 is wired to the gate portion of MOSFET power transistor 70 through biasing resistor 86. Biasing resistor 86 in turn is connected to the positive side of battery 67. Alto Resistor 88 connects the gate of MOSFET power transistor 70 to the negative side of battery 66 and serves two purposes. One purpose is to discharge the gate capacitance of transistor 70 for rapid turn off; and the other purpose is to divide the battery voltage to the gate to allow for low gate turn-on voltages with relatively high battery voltages.

Thus, when Hall effect sensor 76 is activated by permanent magnet 54, transistor 70 is turned on with full power. Power from batteries 66 and 67 is then delivered to electromagnet 20 through diode 90. Electromagnet 20 then moves the wheel forward by pulling permanent magnet 54 into its field. When permanent magnet 54 approaches its equilibrium position, Hall effect sensor 76 is shut off. The unused magnetic energy stored in the electromagnet shows up as a reverse EMF spike. Diode 90 isolates transistor 70 from this spike. Diode 92 then shunts this spike into batteries 67 and 68 to give them a slight charge. Permanent magnet 54 passes by Hall effect sensor 74, switching power from battery 68 though resistors 94 and 96 and Zener diode 98 to activate opto-isolator 100. The phototransistor portion of opto-isolator 100 is wired to the gate portion of MOSFET power transistor 72 through biasing resistor 102. Biasing resistor 102 in turn is connected to the positive side of battery 69. Resistor 104 connects the gate of MOSFET power transistor 72 to the negative side of battery 68 for the purposes of draining the gate capacitance of MOSFET power transistor 72 when the gate voltage is shut-off and divides the gate voltage used to maintain a safe operating level at the gate. Thus when Hall effect sensor 74 is activated by permanent magnet 54, MOSFET power transistor 72 is turned on with fall power. Power from batteries 68 and 69 is then delivered to electromagnet 20 through diode 106, in the opposite direction from that supplied through transistor 70. Electromagnet 20 moves the rotor forward by pushing permanent magnet 54 out of its field, and pulling the next successive permanent magnet into the field. Once permanent magnet 54 has been sufficiently moved out of the field of electromagnet 20, Hall effect sensor 74 shuts off power to the circuit. Stored magnetic energy left in electromagnet 20 shows up as a back EMF spike which is isolated from MOSFET power transistor 72 by diode 106 and is shunted across diode 108 into batteries 66 and 67, thus completing the cycle.

Figure 6:
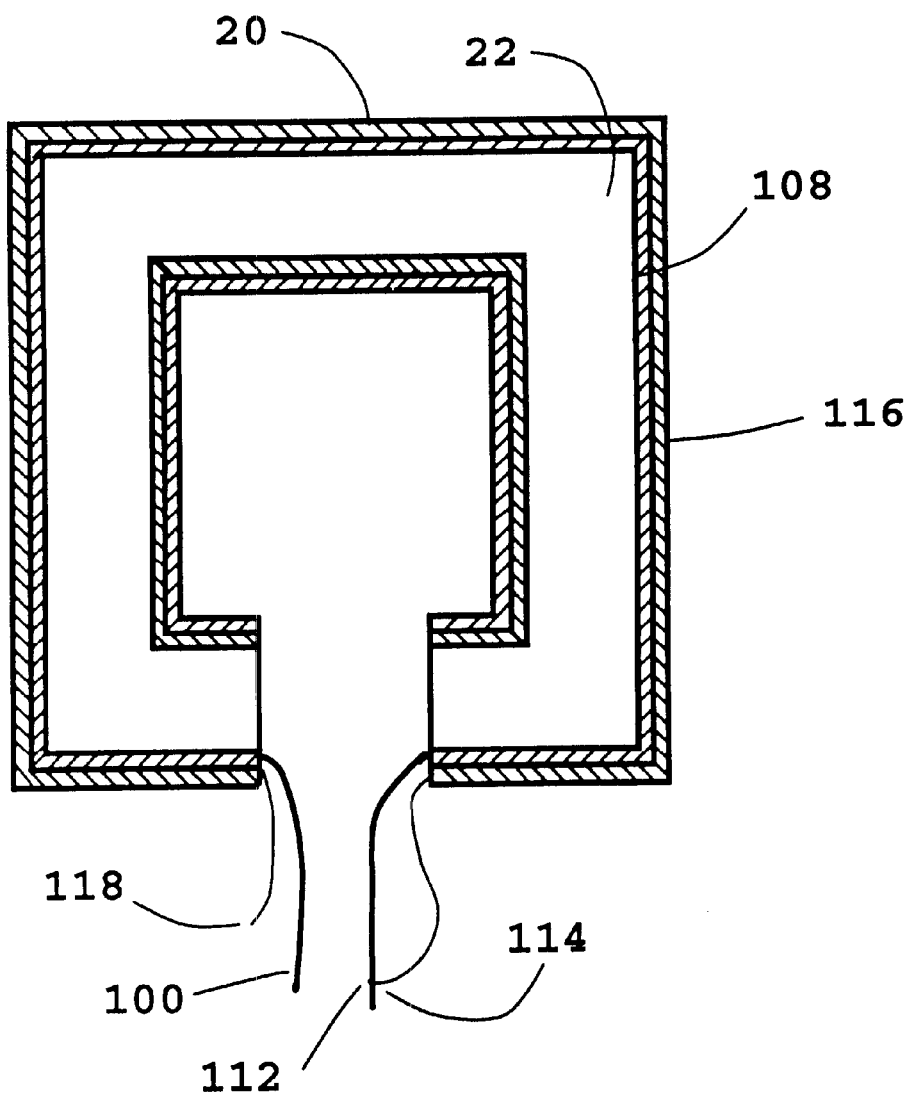
FIG. 6 shows a stator electromagnet having multiple windings of differing wire diameter for increasing motor torque at high RPM values.

FIG. 6 shows one of the stator electromagnets 20 of the high-powered turbofan cooled DC motor of this invention. Electromagnet 20 consists of a laminated iron core 22 in the shape of a "C" which is wrapped with a single layer of heavy gauge electromagnet wire 108 having Ado ends 100 and 112. End 112 is then electrically connected to one end 114 of a lower gauge electromagnet wire 116 which is wound in a second layer over the heavy gauge wire to give a free exposed end 118.

Figure 7:
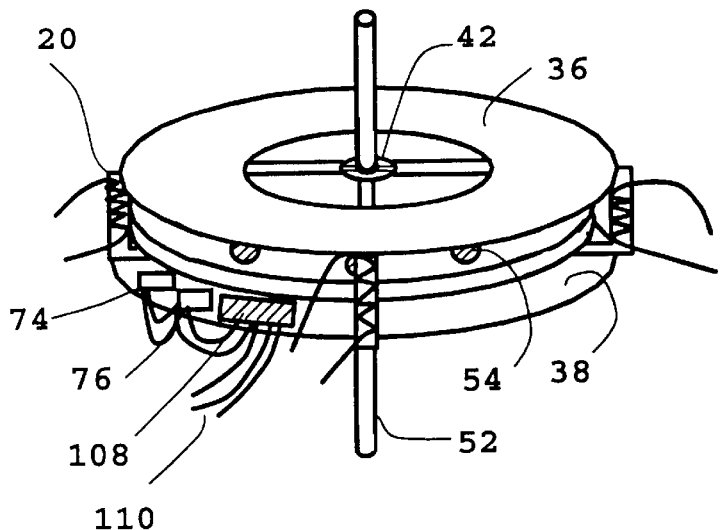
FIG. 7 shows an overall diagram of the high-powered DC turbofan cooled motor of this invention.

FIG. 7 shows a diagram of the complete motor of this invention. Rotor disc 44 along the central shaft 52 is surrounded by electromagnets 20 straddling the edge of disc 44 in alignment with permanent magnets 54 in the rotary disc portion. Further employed are bearings 42 in end plates 36 and 38. End plates 36 and 38 together with electromagnets 20 provide the stationary part of this motor. Hall effect sensors 74 and 76 provide the timing for amplification circuitry 108 and is distributed to electromagnets 20 by wires 110.

Figure 8:
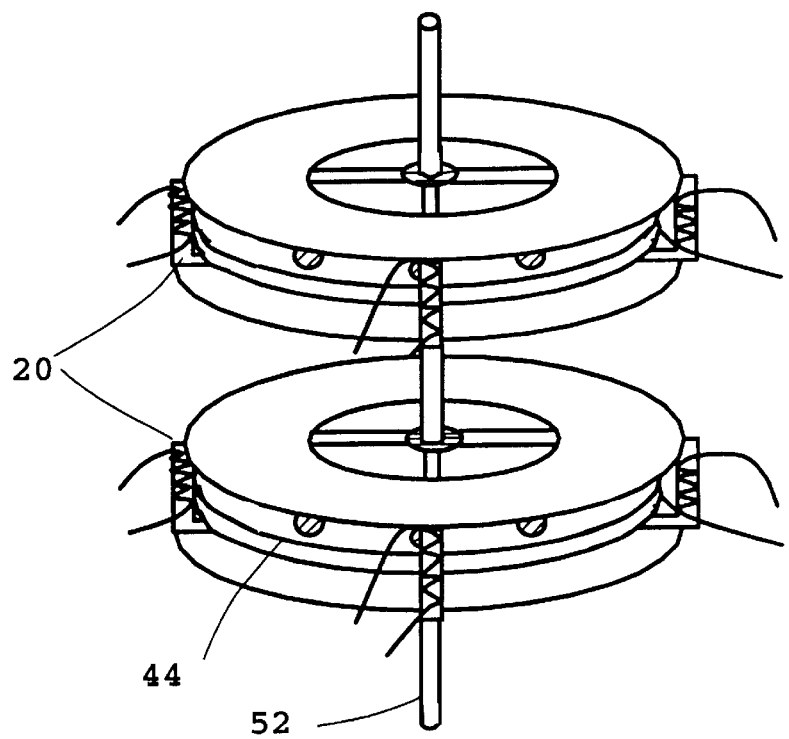
FIG. 8 shows an overall diagram of the high-powered DC turbofan cooled motor of this invention having two rotor discs mounted onto the same central shaft.

FIG. 8 shows two discs 44 on a single shaft 52. Each disc is driven by its own set of electromagnets 20. This geometry provides high torque in a package having a limited diameter and also results in an overall reduction in inertia mass.

Figure 9:
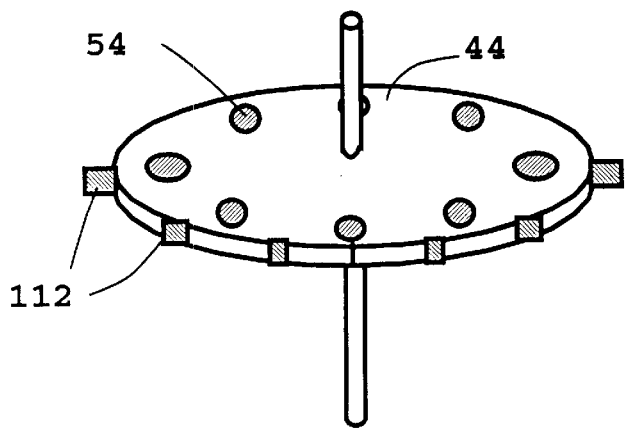
FIG. 9 shows a diagram of the armature of the motor of this invention having short flexible blades emanating radially from the edge of the rotor which allows for adequate cooling under low RPM values but which limits air flow under high RPM values to prevent excess power consumption.

FIG. 9 shows a rotor disc 44 having permanent magnets 54 mounted in the same configuration as those shown in FIG. 4. The disc of FIG. 9 does however have a solid center and fan blades 112 along the edge to provide direct cooling to the electromagnets (now shown). Fan blades 112 may be made of a flexible material such as mylar, kapton, or other polymer film. The flexible fan blades allow for high air flow at low RPM values and reduce aerodynamic drag at high RPM values.

Figure 10:
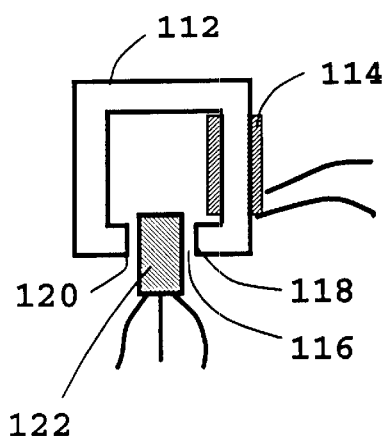
FIG. 10 shows a current sensing device which prevents accidental demagnetization of the rotor permanent magnets at low speeds.

FIG. 10 shows an example of current limiting circuitry suitable for preventing accidental demagnetization of rotor permanent magnets 54 (not shown). A small laminated iron core 112 having slot 116 is provided with several turns of heavy gauge wire 114. Magnetic poles 118 and 120 are formed when current flows through wire 114. Into slot 116 is placed a Hall effect sensor 122 having Schmidt Triggering Circuitry which is used to sense the magnetic field present within gap 116. Windings 114 on iron core 112 are wired in series with electromagnet 20 (not shown). When an unacceptable amount of current flows through windings 114, the magnetic field generated in small iron core 112 activates Hall effect sensor 122 which grounds out the gate of the corresponding MOSFET power transistor providing power to electromagnet 20 and momentarily cuts off the current. The Schmidt triggering aspect of Hall effect sensor 122 is no advantageous in switching the power transistors on and off rapidly in place of reducing the constant current flow on a continuous basis. Such switching results in virtually no voltage drop across circuit elements and allows the MOSFET drive transistors to run cool even under current limiting conditions.

This current limiting device can be used to control current in motor windings to a level sufficient to prevent demagnetization. A single power supply capable of demagnetizing motor permanent magnets under stall conditions may be used with permanent magnet motors having only one winding configuration. The use of this device in conjunction with speed sensing circuitry provides additional protection against accidental demagnetization.

Figure 11:
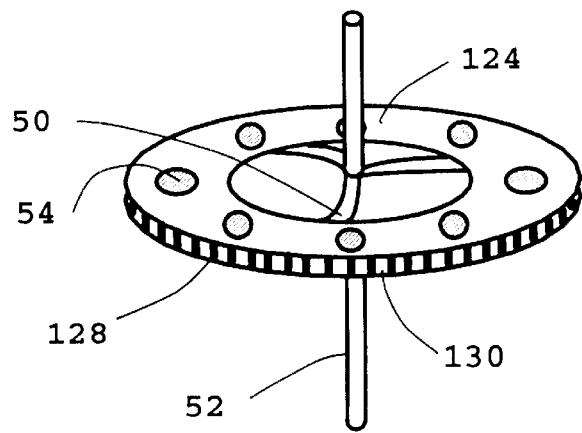
FIG. 11 shows the rotary portion of the motor of this invention having a toothed edge for engagement to a gear or cog belt.

In FIG. 11, rotary disc 124 consists of an outer disc portion 126 fixedly mounted to a central shaft 52 by turbofan blades 50. Outer disc portion 126 has permanent magnets 54 fixedly mounted into outer disc portion 126 with their direction of magnetization transversing through the disc. Also shown are high and low areas 128 and 130 cut into the periphery of outer disc portion 126. These high and low areas may be in the form of gear-type teeth or other teeth suitable for engaging a cog-type belt or other suitable mechanical drive mechanism capable of engaging the outer edge of outer disc portion 126. It should be noted that in some instances several electromagnets (not shown) may have to be removed to allow for mechanical coupling from the edge.

Figure 12:
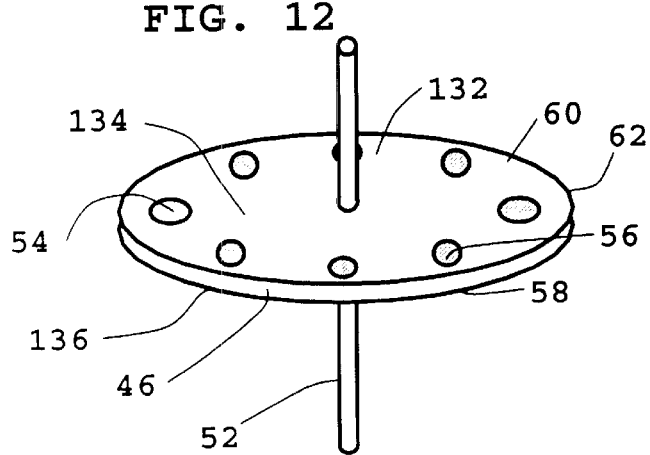
FIG. 12 shows the rotary portion of the motor of this invention consisting of a disc having a smooth surface.

FIG. 12 shows a large diameter disc-shaped rotor 132 having smooth top and bottom surfaces 134 and 136 respectively. Also shown are permanent magnets 54 in edge portion 46 of rotor 132. Permanent magnets 54 are mounted having their magnetic pole faces 56 and 58 on opposite sides 60 and 62 of outer disc portion 46. Also shown is shaft 52.

Figure 13:
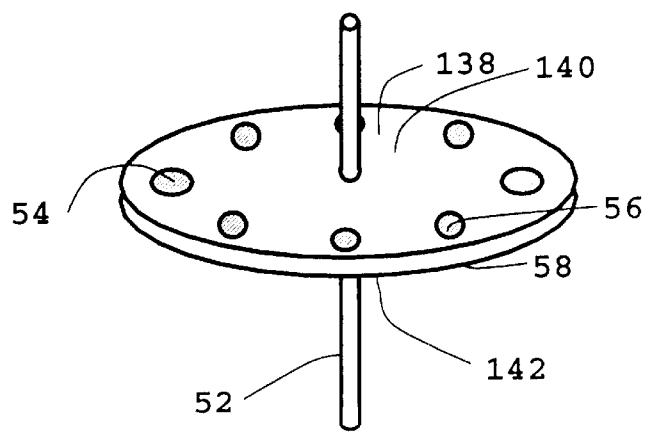
FIG. 13 shows the rotary portion of the motor of this invention consisting of a disc having a roughened surface to increase airflow.

FIG. 13 shows a large diameter disc-shaped rotor 138 having rough textured top and bottom surfaces 140 and 142. Located in the periphery of disc 138 are several permanent magnets 54 mounted having their magnetic pole faces 56 and 58 on opposite sides 140 and 142 of disc 138. As usual shaft 52 is used for power output and registration within the motor.

Figure 14:
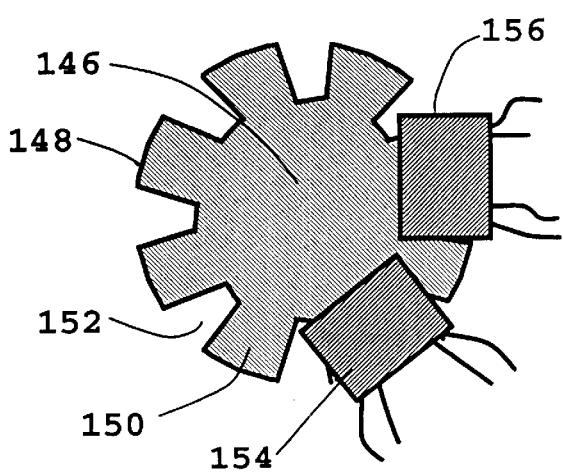
FIG. 14 shows the top view of an optical encoder disc along with photocell gates to provide timing for the high power motor of this invention.

FIG. 14 shows the top view of an optical encoder disc 144 having a central portion 146 and an edge portion 148. Edge portion 148 consists of alternating opaque areas 150 and transparent areas 152. Also shown are two photocell gates 154 and 156 used to provide a signal for timing purposes.

Figure 15:
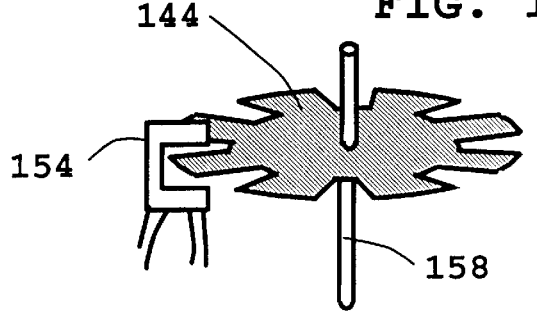
FIG. 15 shows a tilted view of an optical encoder disc and photocell gate used to provide timing for the high power motor of this invention.

FIG. 15 shows a tilted view of optical encoder disc 144 and photocell gate 154. Also shown is shaft 158 which is directly fastened to the end of the motor shaft (not shown).

Figure 16:
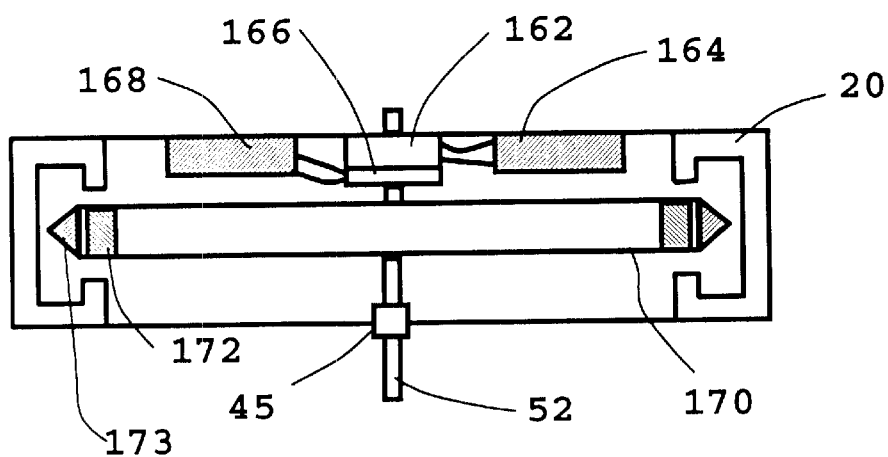
FIG. 16 shows a side view of the high power motor of this invention including a small generator on the shaft for speed sensing, speed sensing circuitry, optical timing circuitry, and amplification circuitry.

FIG. 16 shows a side view of the disc rotor air cooled motor of this invention. Disc rotor motor 160 is shown in complete form. This particular motor includes a small electric generator 162 which senses the rotor speed by generating a voltage which is proportional to the speed. Generator 162 is of the permanent magnet type and therefore requires no field windings and therefore no input power. Such a generator can be either of the DC output type, or conversely the AC output type. In the case of permanent magnet DC output generators, a simple permanent magnet motor will often suffice. Although many speed sensing methods may be employed, the generator offers the best protection against failed circuit components. Such failure can cause premature shunting of electromagnet windings resulting in the potential for demagnetization of rotor permanent magnets. The generator absolutely will not put out a given voltage until a minimum RPM value has been achieved. Failure of the generator results in low or no output voltage. This failure mode will not result in premature shunting problems. Generator 162 can be wired to a relay to either automatically shunt electromagnet taps at a particular speed, or interlock out the accidental premature shunting of electromagnet taps. Generator 162 of motor 160 is wired to a control box 164. Control box 164 contains interlocking circuitry. Beneath generator 162 of motor 160 is optical encoder 166. Optical encoder 166 is mounted to motor shaft 152. The optical encoder itself is shown in detail in FIGS. 14 and 15 previously described. Optical encoder 166 is wired to amplification circuitry 168 which amplifies the signal from optical encoder 166 and inputs the amplified signal into electromagnets 20.

Supported on motor shaft 52 is rotary disc 170 having portions of high permeability magnetic material 172 transversing through the edge portion of disc 170. FIG. 16 particularly illustrates the plurality of C-shaped electromagnets 20 configured to define an inner annular channel 173. The annular edge portion of disc 170 is rotatably disposed within in annular his channel 173. In the case of a permanent magnet motor design, high permeability magnetic material 172 consists of permanent magnets. In the case of a switched reluctance motor design, non-magnetizable ferrite, laminated silicon steel, or powdered iron composite may be employed. Also shown are flexible plastic fan blades 112 which provide air currents to cool electromagnets 20. Motor end plates 36 and 38 provide support for motor shaft 52, electromagnets 20, and Who motor bearings 42. The permanent magnets are disposed on the annular edge portion of disc 170 so that the directions of magnetization thereof transverse through disc 170. In addition, the poles of the permanent magnets are aligned in coupling proximity to the poles of the electromagnets of the stator.

Figure 17:
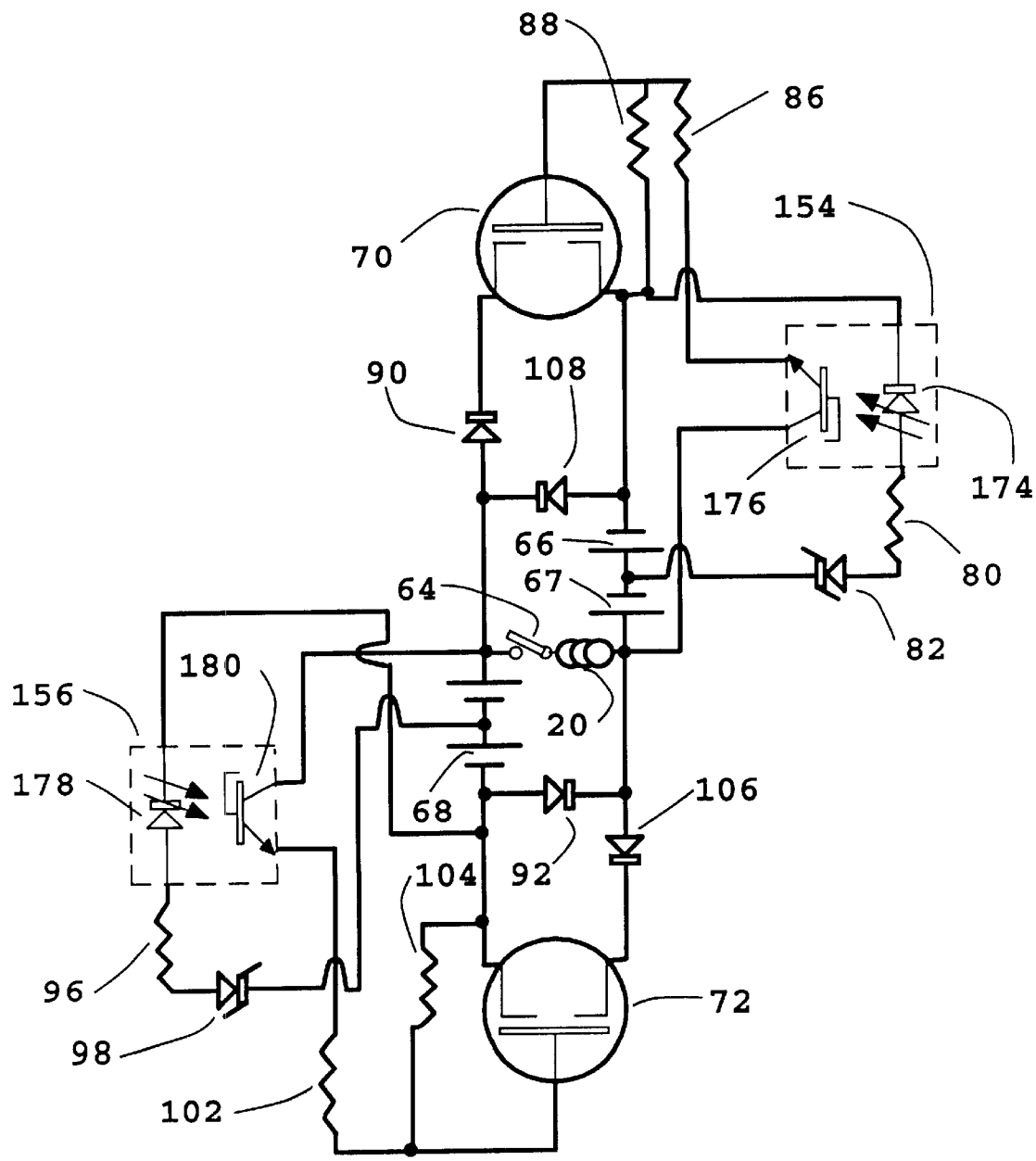
FIG. 17 is a schematic diagram showing optical timing circuitry integrated with transistor amplification circuitry which provides power to the electromagnets in the motor of this invention.

FIG. 17 shows optical timing circuitry integrated with transistor amplification circuitry which provides power to the electromagnets in the motor of this invention. Optical timing gate 154 consists of a light emitting diode 174 and a phototransistor 176 separated by a gap through which the optical timing disc passes (not shown) such optical gates are commercially available from Omron Electronics, Inc., located at One East Commerce Drive Schaumburg, Ill. 60173. Part No. EESG3 is a suitable optical timing gate, although many others will work as well. The motor timing should be 40% on time from sensor 154, then 10% off time, then 40% on time from sensor 156, then 10% off time to complete the cycle. The motor timing itself will vary with the desired operating parameters, but in general the electromagnets should be turned on slightly early with respect to rotor position.

Optical timing gate 154 has its output transistor portion 176 wired to the gate portion of MOSFET power transistor 70. The choice of the exact MOSFET power transistor will depend on the requirements of the particular motor. International Rectifier located at 233 Kansas Street., El Segundo, Calif. 90245 makes a variety of Hexfet MOSFET power transistors. One should be chosen with a low on resistance, and a rated operating voltage of at least twice the voltage used in the motor. The current rating capacity should be several times the normal running current through the device. For example, for an operating voltage of 24 volts, IRFZ48 would be a good choice. This particular transistor has an on resistance of 0.018 ohms, a source to drain voltage of 60 volts, and a continuous current rating of 72 amperes. Proper heat sinking is also recommended. Resistors 86 and 88 provide voltage dividing to the gate of MOSFET power transistor 70. These values should be chosen to properly divide the gate voltage, allow for quick turn on and turn off, and not drain excessive battery power. In general they should be chosen to provide 1 milliampere of switching current. Resistor 88 also drains the gate capacitance of MOSFET power transistor 70 when the gate voltage is shut off by optical sensor 154. This allows for clean switching.

When mechanical switch 64 is closed, electromagnet 20 is controlled by MOSFET switching transistors 70 and 72. Light emitting diode 174 is on continuously from voltage supplied from battery 66 and is controlled by Zener diode 82 and resistor 80. When a transparent portion of the optical timing disc (not shown) passes by optical timing gate 154, LED portion 174 transmits its light to photo transistor 176. Phototransistor 176 turns on and power flows through voltage dividing resistors 86 and 88. This turns on MOSFET power transistor 70 thereby providing power from batteries 66 and 67 through diode 90 and into electromagnet 20. The interaction of the magnetic field produced by electromagnet 20 and the magnetic material in the rotor provides propulsive force to the edge of the rotor thereby providing mechanical power. Just before the magnetic material in the rotor(not shown) aligns itself in the magnetic field in the electromagnet, optical sensing gate 154 is shut off by an opaque region of the optical timing disc (not shown). MOSFET power transistor 70 is then shut off. Remaining stored magnetic energy in electromagnet 20 then shows up as a reverse voltage spike. Diode 90 isolates MOSFET power transistor 70 from this spike while diode 92 shunts this reverse voltage spike into batteries 68 and 69 giving them a slight charge. As the magnetic material in the rotor passes by its equilibrium position with respect to electromagnet 20, optical sensing gate 156 is turned on as a transparent portion of the optical timing disc (not shown) passes through. Light emitting diode 178 is on continuously from voltage supplied from battery 68 and is controlled by Zener diode 98 and resistor 96. Light from light emitting diode 178 in optical sensing gate then activates phototransistor 180 thereby supplying voltage to the gate of MOSFET power transistor 72 through voltage dividing resistors 102 and 104. MOSFET power transistor 72 then turns on supplying power from batteries 68 and 69 to electromagnet 20 through diode 106. The interaction of the magnetic field provided by electromagnet 20 and the magnetic material in the rotor provides further propulsive force to the edge of the rotor thereby providing mechanical power. Just before the magnetic material in the rotor (not shown) aligns itself in the magnetic field in the electromagnet, Optical sensing gate 156 is shut off by an opaque region of the optical timing disc (not shown). MOSFET power transistor 72 is then shut off. Remaining stored energy in electromagnet 20 then shows up as a reverse voltage spike. Diode 106 isolates MOSFET power transistor 72 from this spike while diode 108 shunts this reverse voltage spike into batteries 67 and 68 thus completing the cycle.

The timing of actual switching is fundamentally different between a disc rotor having permanent magnets and that of a disc rotor having non-magnetizable high permeability material. In the first case, permanent magnets can be made to repel as well as attract simply by changing the direction of current flowing through electromagnet 20. In the second case of switched-reluctance, attraction is the only net force. The two transistor circuitry however is advantageous in driving such switched-reluctance motor designs in that utilization of reverse voltage spikes is easily achieved which also reduces arcing of switch contacts.

Figure 18:
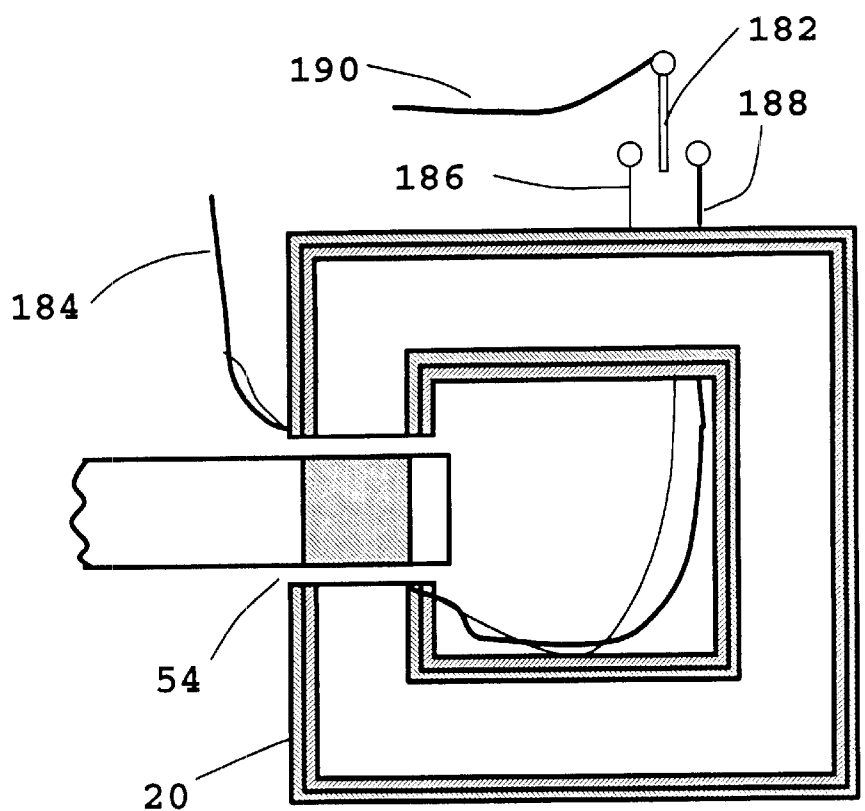
FIG. 18 shows an electromagnet assembly including switching circuitry having thick wire wrapped around the core to a first tap, and thinner wire wrapped over the thick wire to a second tap.

FIG. 18 shows an electromagnet assembly 20 with an SPDT switch 182. Also shown is a common wire 184 and two tapped input leads 186 and 188. Lead 188 is thick wire wound around the electromagnet core. Output lead 186 is the tap corresponding to the second layer of wire to be wrapped around the electromagnet core and is of a thinner gauge than that of the first layer of wire. The output lead from SPDT switch 182 is 190. Thus output leads 184 and 190 of electromagnet 20 form a multiple tap electromagnet in conjunction with SPDT switch 182. On motor start up SPDT switch 182 connects lead 190 to electromagnet lead 186. The entire length of electromagnet wire is activated. The thin outer layer of wire connected to lead 186 prevents excessive electromagnet currents from demagnetizing permanent magnet 54. Once a safe rotor speed has been achieved, SPDT switch 182 can be switched to electromagnet tap 188 thus shunting the entire length of thin electromagnet wire 186. This will substantially increase rotor power, speed, and torque.

Figure 19:
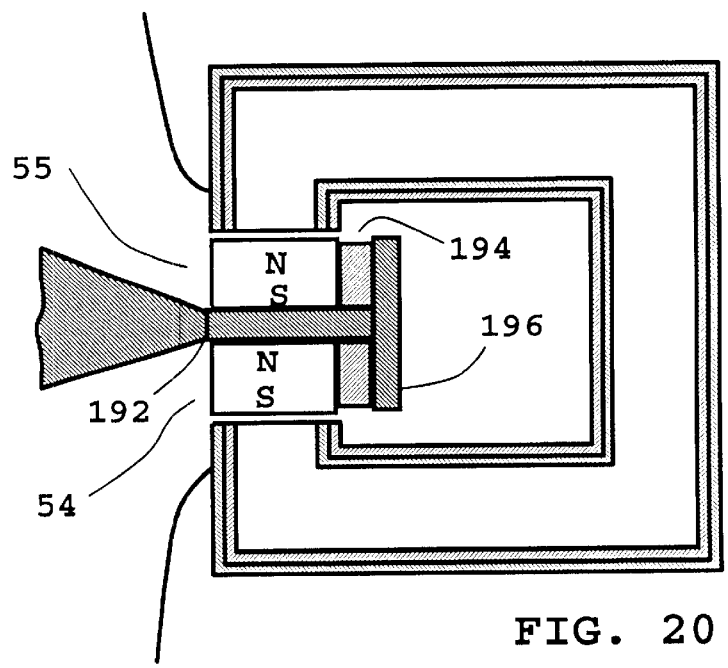
FIG. 19 shows a sectional view of the edge of the disc traveling through an electromagnet gap including permanent magnets sandwiching a flat steel spoke.

FIG. 19 shows a permanent magnet pair formed of permanent magnets 54 and 55 sandwiching a piece of steel 192. Steel piece 192 forms a flat planar spoke to provide a strong mechanical bond between the inner portion of the rotor and the periphery where the permanent magnets are located. Also shown is a piece of non-magnetic material 194 which provides support for permanent magnets 54 and 55 during running. Non-magnetic material 194 also provides separation distance from T-shaped steel piece 196 thus preventing a short circuit of their magnetic flux.

Figure 20:
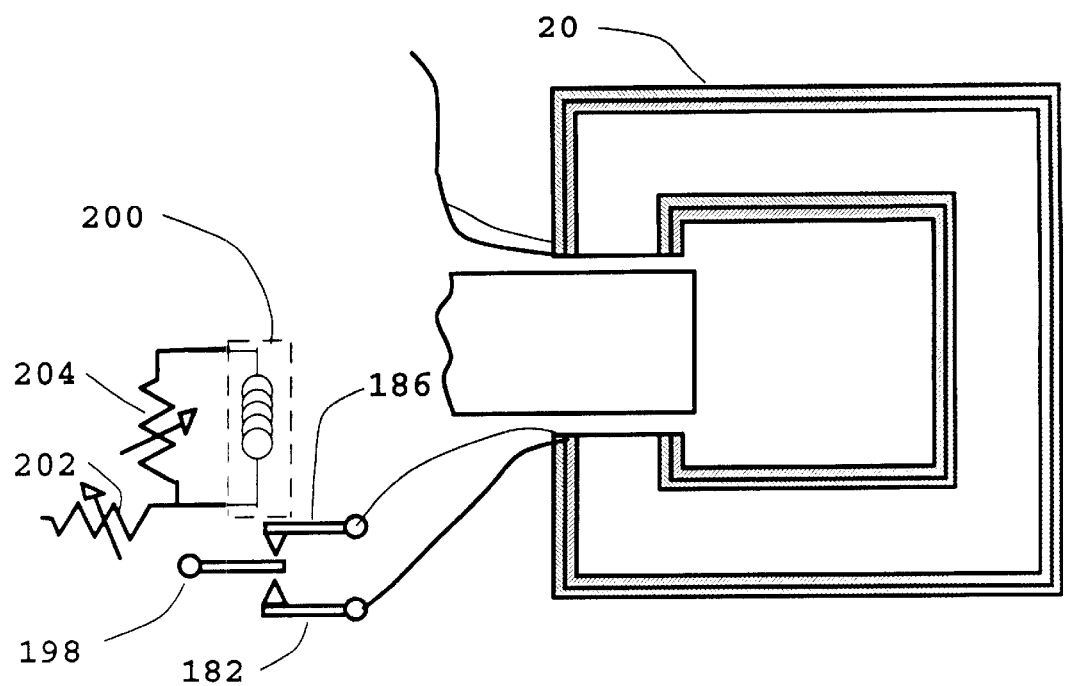
FIG. 20 shows a multitap electromagnet having the tap selection controlled by a relay which receives a voltage signal from a small electric generator.

FIG. 20 shows multiple tap electromagnet 20 interfaced to relay 198 for either interlocking of or automatic switching of electromagnet taps 182 and 186 based on a voltage input from a generator (not shown) to relay coil 200. Variable resistors 202 and 204 control the activation voltage of relay 198.

Figure 21:
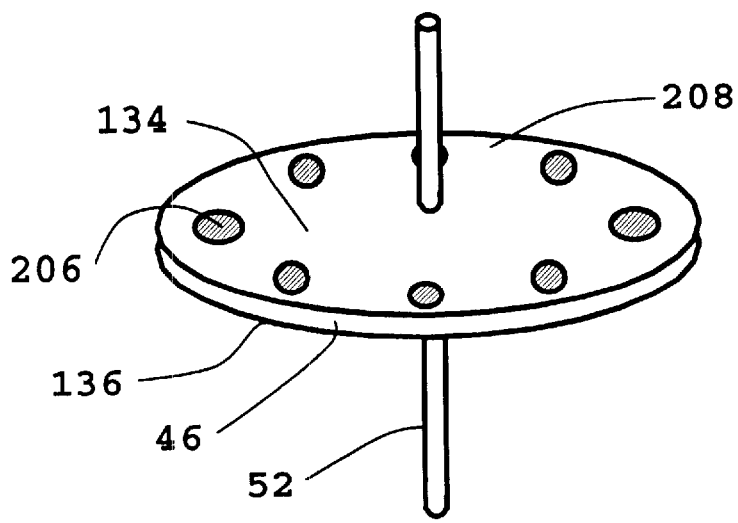
FIG. 21 shows a smooth rotary disc rotor of this invention incorporating a non-magnetizable high permeability material in the periphery to provide mechanical power by switch-reluctance.

FIG. 21 shows a large diameter disc-shaped rotor 208 having smooth top and bottom surfaces 134 and 136 respectively. Also shown are sections of high permeability non-magnetizable ferromagnetic material 206 in edge portion 46 of rotor 208. Also shown is shaft 52.

Figure 22:
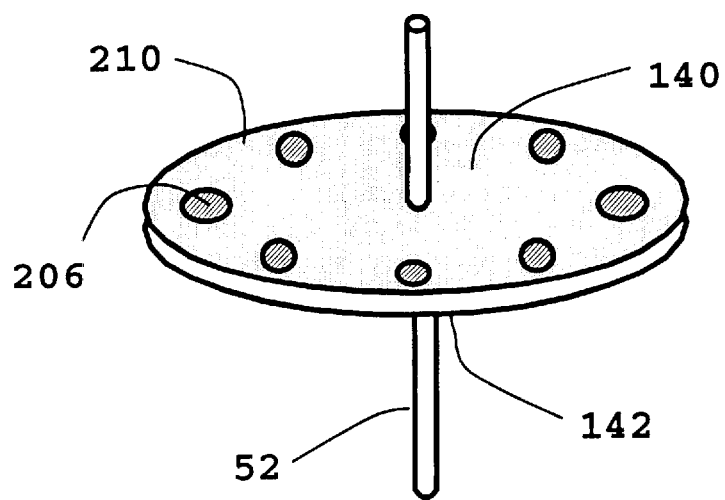
FIG. 22 shows a rotary disc rotor having a rough texture surface incorporating a non-magnetizable high permeability material in the periphery to provide mechanical power by switch-reluctance.

FIG. 22 shows a large diameter disc-shaped rotor 210 having rough textured top and bottom surfaces 140 and 142. Located in the periphery of disc 210 are sections of high permeability non-magnetizable ferromagnetic material 206. As usual shaft 52 is used for power output and registration within the motor.

Figure 23:
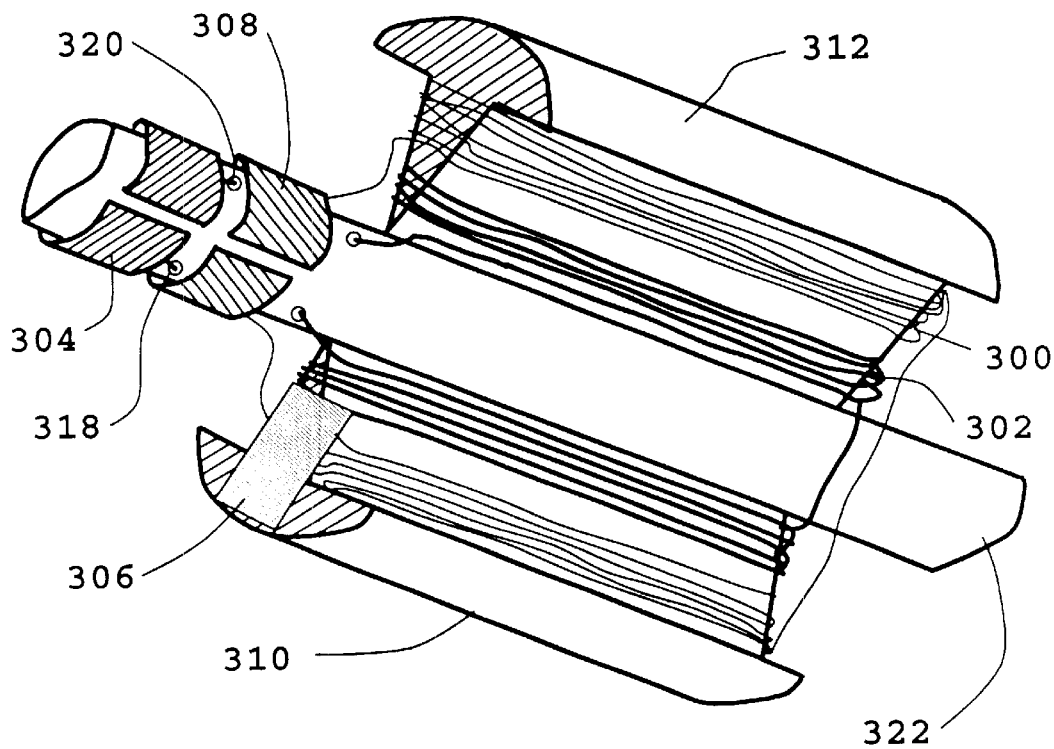
FIG. 23 shows the rotary portion of a brush timed permanent magnet motor having two separate electromagnet windings wrapped around the core each having their own set of commutators, and a centrifugal switch.

FIG. 23 shows the rotary portion of a brush timed permanent magnet motor having two separate sets of electromagnet windings 300 and 302. Inner winding set 302 which is closest to shaft 322, is always connected to commutator 304 regardless of speed. Because of this, when power is provided to commutator 304, electromagnet windings 302 will be activated and the motor will run at low power. Once rotor RPM values reach a safe level that allow for winding set 300 to be activated without the risk of demagnetizing motor permanent magnets (not shown), centrifugal switch 306 closes thereby connecting outer windings 300 to commutator 308. At this point, if more motor power is desired, power may be applied to commutator 308 thereby increasing the magnetic field of rotor electromagnet pole faces 310 and 312. Holes 314, 316, 318, and 320 in motor shaft 322 are used for routing the leads of electromagnet windings 302 under commutator 308 for connection to commutator 304.

FIG. 24 shows the rotary portion of a brush timed permanent magnet electric motor having two layers of electromagnet windings 300, and 301. Layer 300 is the first layer which is made of wire having a heavier gauge than layer 301 which is the second layer. Also shown is commutator 308 which is wired to the start of winding 300 at connection 324. The other end of winding 300 is connected to one side of centrifugal switch 306 and the start of winding 301 at connection 326. The other connection 328 to centrifugal switch 306 is connected to commutator 308 and the remaining end of electromagnet winding 301. Also shown is shaft 322. When power is applied to commutator 308 by brushes (not shown) current to electromagnet winding 300 is limited by high resistance electromagnet winding 301. Under these conditions, permanent magnet motors employing such rotors will run at low power. Once rotor RPM values reach a safe level whereby shunting of electromagnet windings 301 will not result in demagnetization of motor permanent magnets (not shown), centrifugal switch 306 closes connection 326 to connection 328 thereby shunting electromagnet winding 301. This allows electromagnet winding 300 to be activated with fill power. This increases the magnetic field of rotor electromagnet pole faces 310 and 312.

Figure 25:
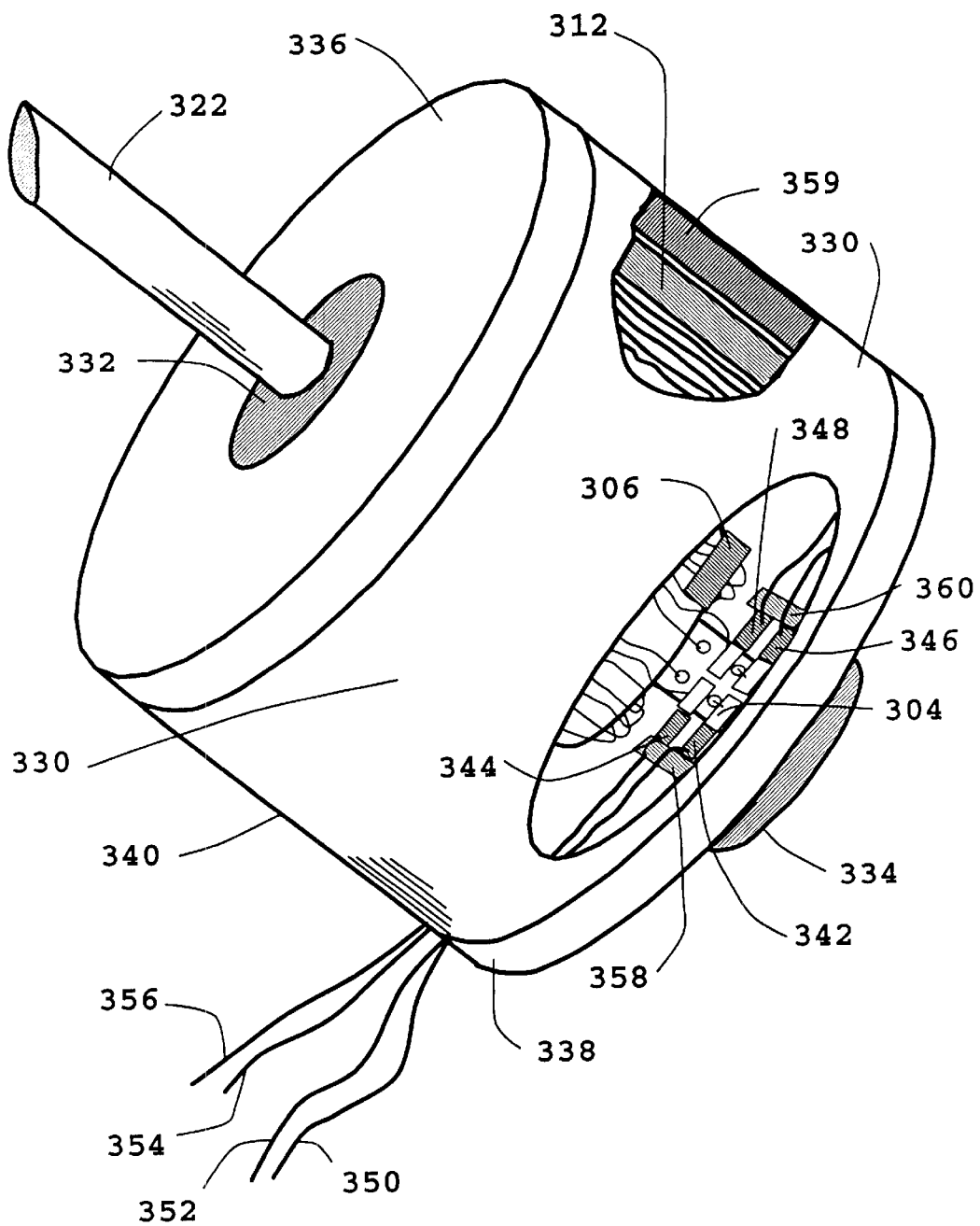
FIG. 25 shows a brush timed permanent magnet electric motor employing a rotor having two separate electromagnet windings, and a centrifugal switch for activating both sets of windings at a pre-set value.

FIG. 25 shows a brush timed permanent magnet electric motor 330 employing the rotor of FIG. 23. Shaft 322 of this motor is rotatably supported by motor bearings 332 and 334 in end caps 336 and 338. End caps 336 and 338 are mounted to motor casing 340 and support bearings 332 and 334. Also shown are brushes 342, 344, 346, and 348, which are supported by brush mounts 358 and 360. Brushes 342, 344, 346, and 348 provide electric power to rotor commutators 304, and 308. Motor leads 350, 352, 354, and 356 are electrically connected to brushes 342, 344, 346, and 348, and are used for supplying electric power to motor 330. Centrifugal switch 306 is also shown which allows commutator 308 to supply power to extra electromagnet winding 300 at a pre set RPM value. Also shown is a cut away portion of electric motor 330 showing one of the motor permanent magnets 359 which is mounted against motor casing 340. Also shown in the cut away portion of this drawing is rotor electromagnet pole face 312.

Figure 26:
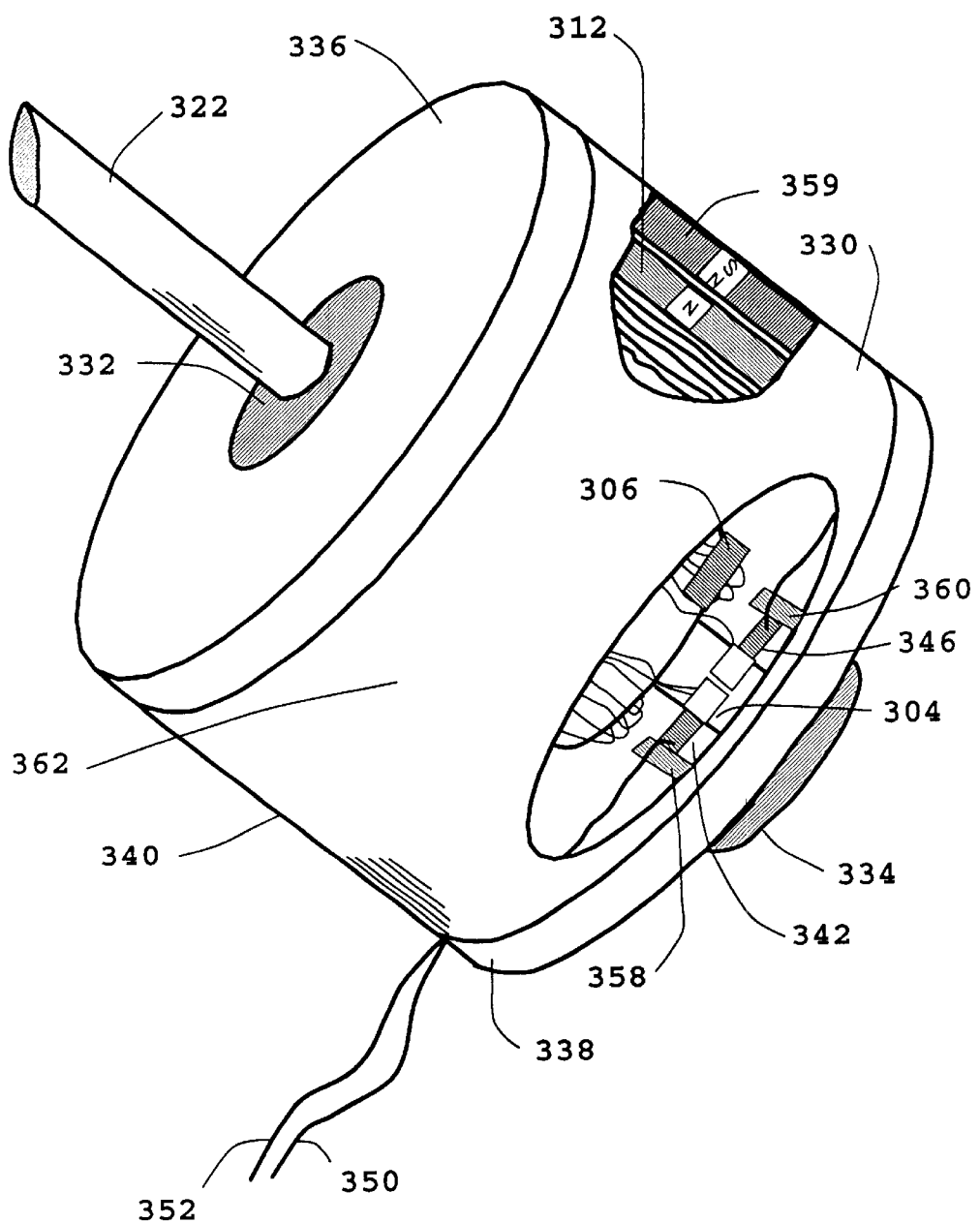
FIG. 26 shows a brush timed permanent magnet DC electric motor having added u winding, which are made from thicker wire than the first set.

FIG. 26 shows a brush timed permanent magnet electric motor 362 employing the rotor of FIG. 24. Shaft 322 of this motor is rotatably supported by motor bearings 332 and 334 in end caps 336 and 338. End caps 336 and 338 are mounted to motor casing 340 and support bearings 332 and 334. Also shown are brushes 342, and 346, which are supported by brush mounts 358 and 360. Brushes 342 and 346 provide electric power to rotor commutator 304. Centrifugal switch 306 is also shown which shunts out the thinner outer electromagnet windings (not shown) in the rotational portion of motor 362 when the RPM value reaches a pre set level. Also shown is a cut away portion of electric motor 362 showing one of the permanent magnets 358 which is mounted against motor casing 340. Also shown in the cut away portion of this drawing is rotor electromagnet pole face 312.

Figure 27:
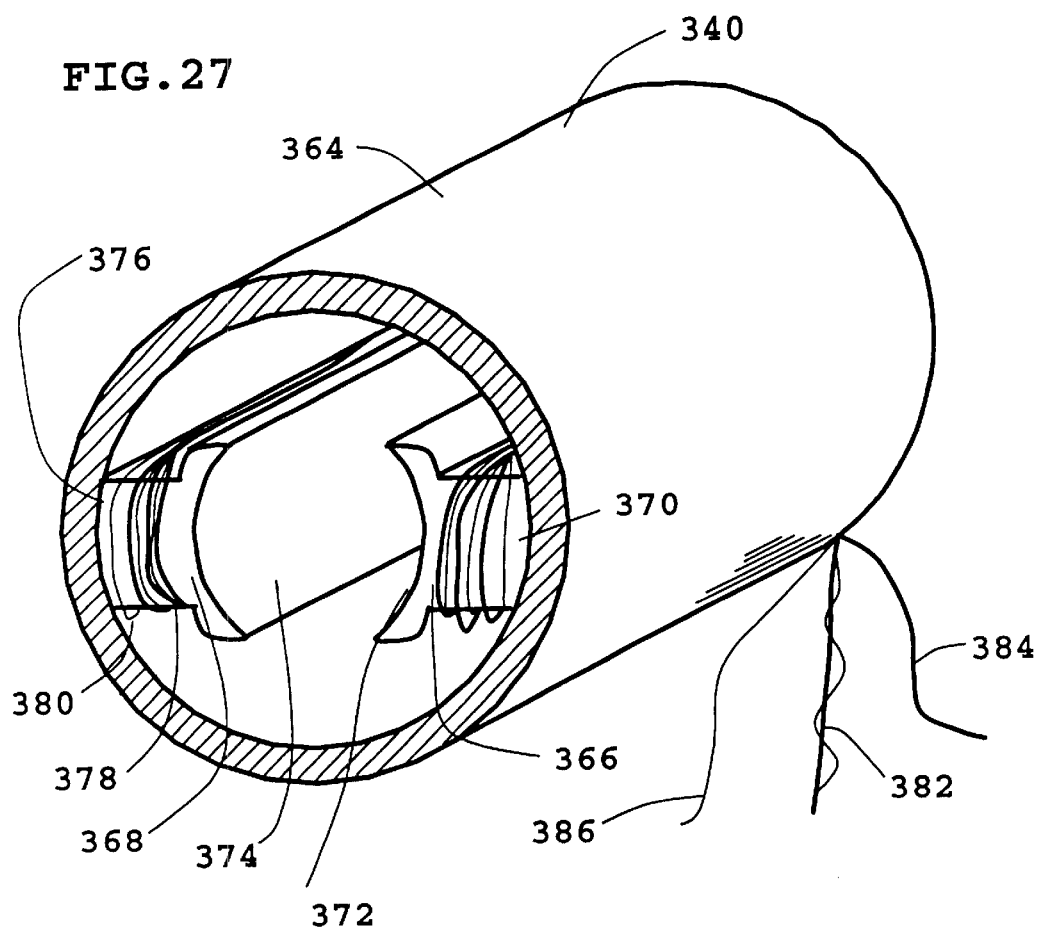
FIG. 27 shows the stationary electromagnet portion of a typical brushless permanent magnet DC electric motor having added electromagnet windings which are made from thicker wire than the first set.

FIG. 27 shows the stationary electromagnet portion 364 of a typical brushless permanent magnet DC electric motor having added electromagnet windings which are made from thicker wire than the first set. Electromagnet casing 340 is made from steel and therefore is capable of efficiently transmitting magnetic flux. Stator electromagnets 366 and 368 consist of laminated electrical steel to reduce eddy current losses when the motor is in operation. Stator electromagnet 366 has two pole faces 370 and 372. Pole face 370 is attached to motor casing 340. Electromagnet pole face 372 faces inward in a radial direction and is aligned with the opposing inward facing electromagnet pole face 374 of electromagnet 368. Electromagnet 368 has a second pole face 376 which is attached to motor casing 340. Both electromagnets 366, and 368 are wrapped with two layers 378, and 380, of electromagnet wire. The first layer of electromagnet wire, layer 378, is of a greater thickness in cross section than is the wire of second layer 380. Layers 378 and 380 are both wired in series with a central tap 382 which is common to both windings. Wire lead 384 is the starting lead made of thick wire for electromagnet windings 378 and 380. This lead is the starting lead. Lead 382 is the lead at the end of thick electromagnet winding 378. This lead is also the starting of thinner electromagnet winding 380. Lead 386 represents the end lead of thinner electromagnet winding 380. When power is applied to leads 384, and 386. Because the thinner electromagnet wire is in series with the thicker wire, the current to the motor is limited to that which will flow under the applied voltage through the resistance of both windings in series. When power is applied across leads 382 and 384, a significantly greater amount of current flows thus increasing the magnetic field between stator electromagnet pole faces 372, and 374.

Figure 28:
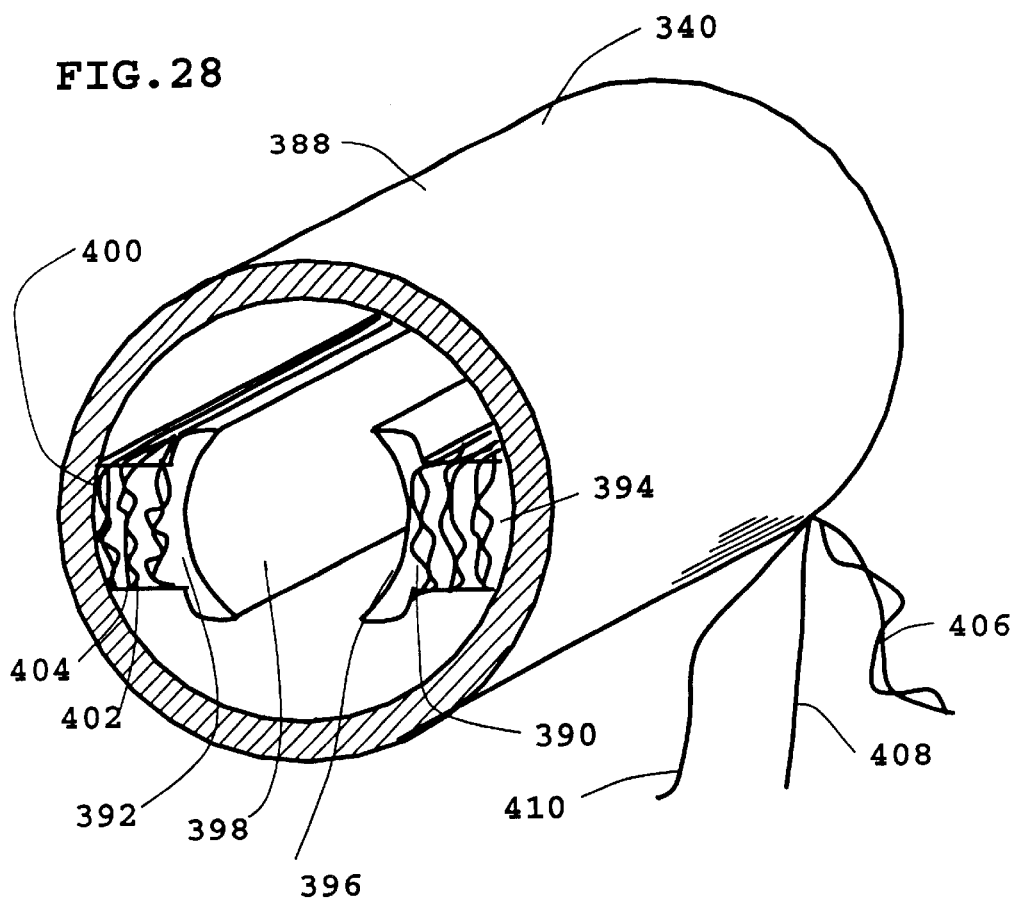
FIG. 28 shows the stationary electromagnet portion of a typical brushless permanent magnet DC electric motor having electromagnet windings made from twisting two strands of electromagnet wire together.

FIG. 28 shows the stationary electromagnet portion 388 of a typical brushless permanent magnet DC electric motor employing electromagnet windings which are made from twisting two strands of electromagnet wire together prior to winding of stator electromagnets 390 and 392. Electromagnet casing 340 is made from steel and therefore is capable of efficiently transmitting magnetic flux. Stator electromagnets 390 and 392 consist of laminated electrical steel to reduce eddy current losses when the motor is in operation. Stator electromagnet 390 has two pole faces 394 and 396. Pole face 394 is attached to motor casing 340. Electromagnet pole face 396 faces inward in a radial direction and is aligned with the opposing inward facing electromagnet pole face 398 of electromagnet 392. Electromagnet 392 has a second pole face 400 which is attached its to motor casing 340. Both electromagnets 390, and 392 are wrapped with two twisted strands 402, and 404, of electromagnet wire. Electromagnet wire strands 402, and 404, are electrically connected to each other at lead 406. The two twisted strands of wire are then wound around both electromagnet cores thus forming electromagnets 390, and 392. The two ends 408, and 410 of the twisted strand are kept electrically isolated from one another.

When electric power is applied as across lead 406 and either lead 408 or lead 410, the current to the motor is limited to that which will flow under the applied voltage through the resistance of a single strand of wire. When leads 408 and 410 are electrically connected together, both strands of wire are now connected in parallel. The amount of current that will flow through the electromagnet windings is effectively doubled. Under these conditions, an increase in the magnetic field between stator electromagnet pole faces 396, and 398 is the result.

FIG. 29 shows the stationary electromagnet portion 432 of a typical brushless DC permanent magnet electric motor employing two isolated sets of electromagnet windings on stator electromagnets 420 and 422. Electromagnet casing 340 is made of steel and therefore is capable of efficiently transmitting magnetic flux. Stator electromagnets 420 and 422 consist of laminated electrical steel to reduce eddy current losses when the motor is in operation. Stator electromagnet 420 has two pole faces 424, and 426. Pole face 426 is attached to motor casing 340. Electromagnet pole face 424 faces inward in a radial direction and is aligned with the opposing inward facing electromagnet pole face 428 of electromagnet 422. Electromagnet 422 has a second pole face 430 which is attached to motor casing 340. Both electromagnets are wound with two separate sets of windings. Electromagnet 420 is wound with a first set of windings 434, and a second set of windings 436. Electromagnet 422 is wound with a first set of electromagnet windings 438, and a second set 440. Electromagnet windings 434, and 438 are connected together in series and end at leads 412, and 414. Electromagnet windings 436, and 440 are connected together in series and end at leads 416, and 418. Applying electric power to either set of leads results in a magnetic field in electromagnets 420, and 422 that will not be sufficient to demagnetize rotor permanent magnets (not shown) under motor stall conditions. When it is desirable to increase the field strength of electromagnets 420, and 422 power is appropriately applied to both sets of leads.

Figure 30:
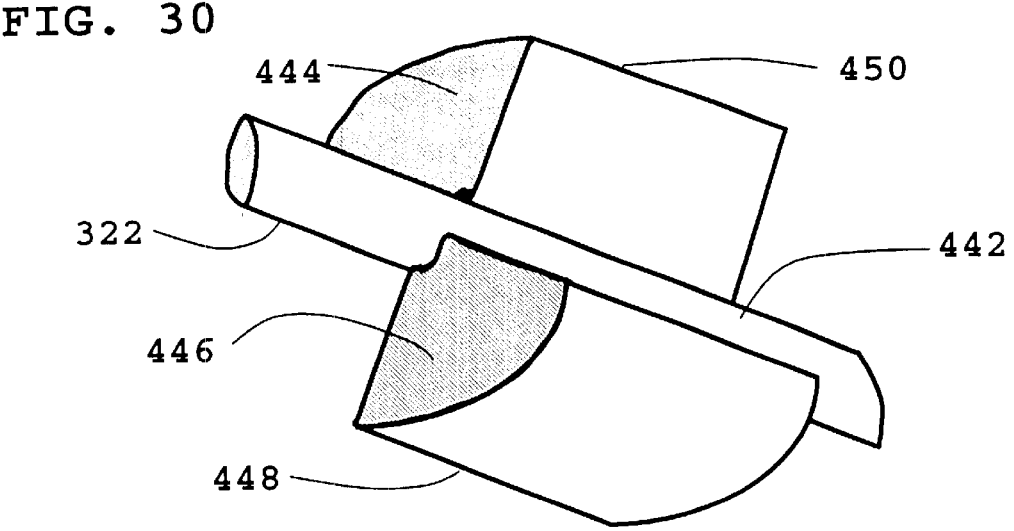
FIG. 30 shows the permanent magnet rotary portion of a typical brushless DC electric motor.

FIG. 30 shows the rotary portion of a typical DC brushless electric motor. Rotary portion 442 consists of a shaft 322 attached to permanent magnets 444, and 446. Permanent magnets 444, and 446 have their direction of magnetization such that exposed face 448 of permanent magnet 446 is north and points outward in a radial direction, and exposed face 450 of permanent magnet 444 is south and points outward in a radial direction as well.

FIG. 31 shows a brushless DC electric motor of this invention having the front end cap removed to expose the inner workings. Rotor 442 of FIG. 30 is shown inside of multi-tap electromagnet assembly 364 of FIG. 27. Also shown is end cap 338 and small electric generator 452. Small electric generator puts out a voltage which is proportional to motor RPM values and is used as part of the interlocking circuitry of this invention. Power output leads 554, and 556 of small electric generator 452 are wired to a relay such as relay 200 of FIG. 20 in the original application. Also shown is the photocell gate casing 558 which houses the photocell gate circuitry for sensing rotor position. A detailed diagram of the photocell gate and light control disc are shown in FIG. 15 of the original application. Photocell gate sensor leads 560, 562, 564, and 568 are wired to the transistor amplification circuitry shown in FIG. 17 of the original application. Also wired to this circuitry of course are motor power input leads 382, 384, and 386.

FIG. 32 shows the rotary portion 570, of a large diameter brushless DC electric motor consisting of a central turbofan portion 572, and permanent magnets 574 around the inside periphery of rotary portion 570. Also shown is motor shaft 576 which is fixedly mounted to the center of turbofan portion 572. Permanent magnets 574 are mounted having their pole faces facing inward in a radial direction, and oppositely polarized with each successive permanent magnet. The opposite pole faces of each permanent magnet are facing the inner portion 578 of the periphery portion of rotor 570. The periphery portion of rotor 570 is made from a ferromagnetic material such as steel to magnetically connect permanent magnets 574 and concentrate their flux inward in a radial direction.

Figure 33:
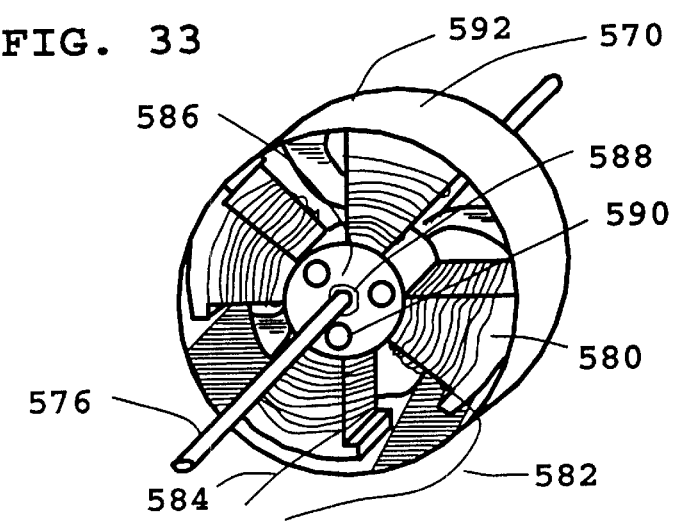
FIG. 33 shows a large diameter brushless DC electric motor having a rotary portion consisting of a central turbofan and permanent magnets around the periphery, and a centrally located star shaped electromagnet.

FIG. 33 shows a large diameter brushless DC electric motor 592, consisting of the rotary portion of FIG. 32, and a centrally located star shaped electromagnet 580. Bearing 588 rotatably connects end plate 586 to motor shaft. End plate 586 is fixedly mounted into the central portion of star shaped electromagnet 580. Mounting holes 590 are used to mount the motor to a suitable piece of equipment such as the frame of an automobile, or some piece of high powered industrial equipment. Power input leads 582 and 584 provide power to star shaped electromagnet 580 through a transistor amplification circuit (not shown) such as the one illustrated in FIG. 17 in the original patent application. The motor is timed with position sensing circuitry (not shown) such as the photocell gate assembly outlined in FIG. 15 in the original patent application.

Figure 34:
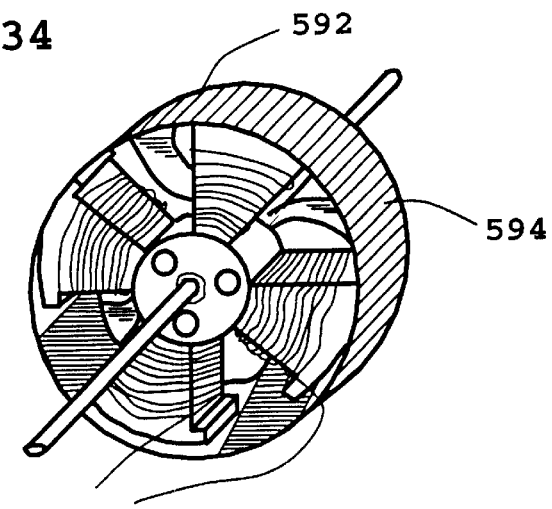
FIG. 34 shows a large diameter brushless DC electric motor having a rotary portion consisting of a central turbofan and permanent magnets around the periphery, a centrally located star shaped electromagnet, and added gear teeth around the outside periphery.

FIG. 34 shows a large diameter brushless DC electric motor 592 having a rotary portion consisting of a central turbofan and permanent magnets around the periphery, a centrally located star shaped electromagnet, and added gear teeth 594 around the outside periphery.

FIG. 35 shows a large diameter brushless DC electric motor 592 having a rotary portion consisting of a central turbofan and permanent magnets around the periphery, a centrally located star shaped electromagnet, and teeth 596 for engagement to a cog belt around the outside periphery.

FIG. 36 shows a large diameter air cooled electric motor 592 of this invention employed in a vehicle hub drive system having a steel rim 598, permanent magnets attached to the inside portion, a star shaped electromagnet assembly 580, which is bolted onto the vehicle frame (not shown), and large structural air moving spokes 600 for connecting the outer rim portion 598 to axle assembly 576.

Figure 37:
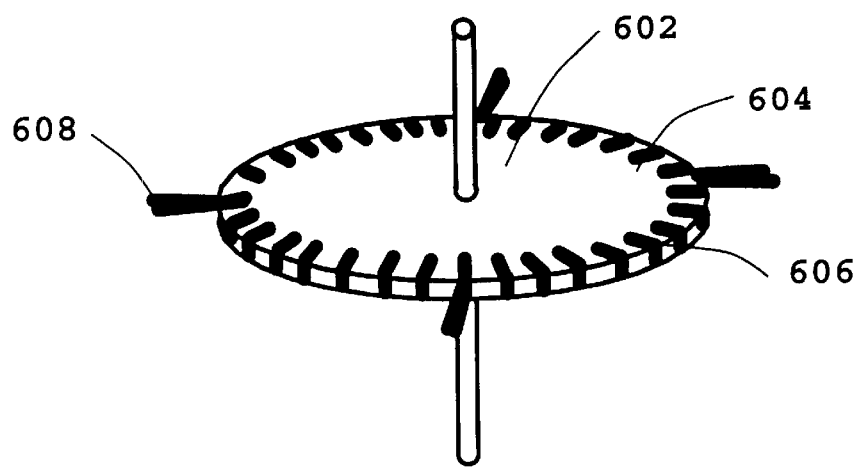
FIG. 37 shows the rotary portion of a large diameter brushless DC motor consisting of a planar disc having permanent magnets about the periphery in a radial direction, and fixed air moving vanes protruding from the edge.

FIG. 37 shows the rotary portion 602 of a large diameter brushless DC motor consisting of a planar disc 604 having permanent magnets 606 about the periphery in a radial direction, and fixed air moving vanes 608 protruding from the edge. In this particular large diameter rotor, permanent magnets 606 have a direction of magnetization which is in a radial direction with each successive permanent magnet being oppositely polarized. Fixed air moving vanes 608 are on the top surface of planar disc 604 and move air from top to bottom of the electromagnets (not shown).

Figure 38:
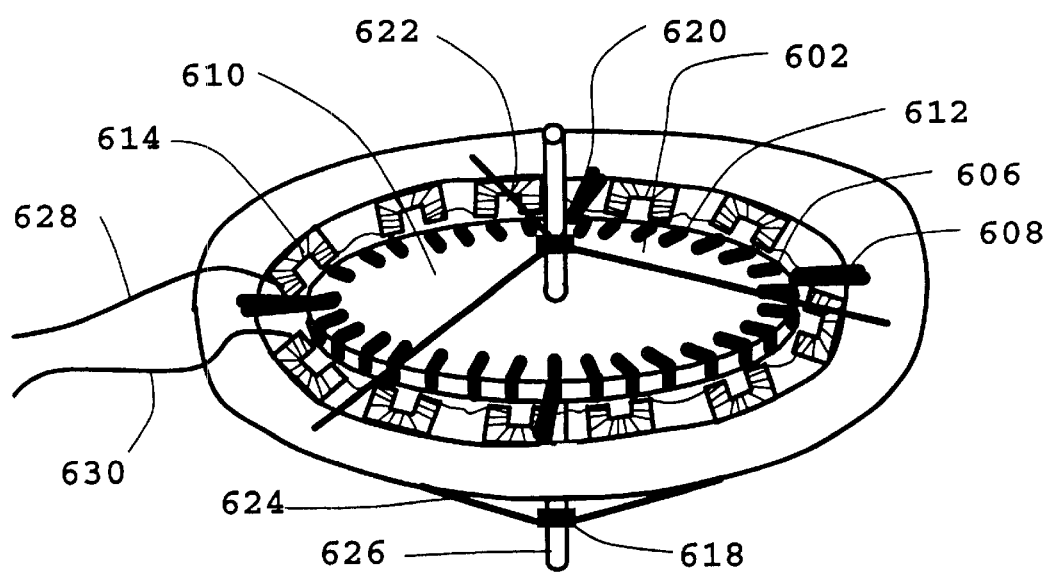
FIG. 38 shows a large diameter brushless motor consisting of a planar disc rotor having permanent magnets about the periphery in a radial direction, electromagnets pointing inward toward the edge of the disc, and fixed air moving vanes protruding from the edge of the disc which move air over the electromagnets.

FIG. 38 shows a large diameter brushless motor 610 consisting of a planar disc rotor 602 having permanent magnets 606 about the periphery in a radial direction, electromagnets 614 pointing inward toward the edge of the disc, and fixed air moving vanes 608 protruding from the edge of the disc which move air over electromagnets 614. Also included is electromagnet mounting plate 616 along with bearings 618 and 620 which rotatably connect mounting brackets 622, and 624 to motor shaft 626. Mounting brackets 622, and 624 are firmly fastened to mounting plate 616. Electric power is applied to leads 628, and 630 from the transistor amplification circuit of FIG. 17 in the original patent application (not shown). As usual, Timing is provided by the photo-optic position sensing apparatus of FIG. 15 in the original application (not shown).

Figure 39:
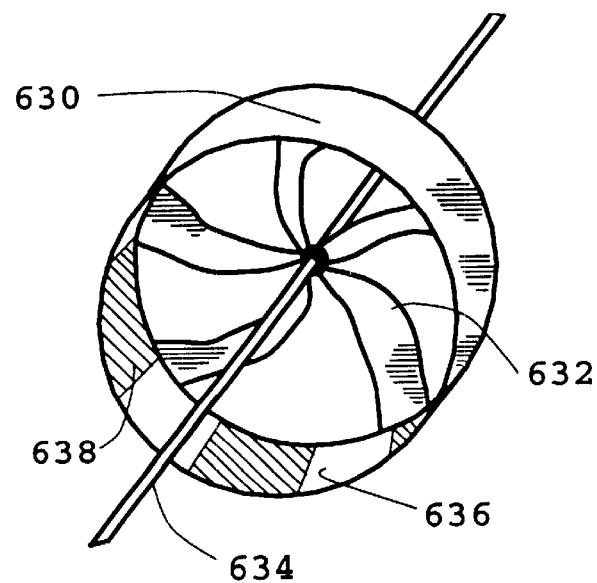
FIG. 39 shows the rotary portion of a large diameter brushless DC electric motor consisting of a central turbofan portion and non-magnetizable high permeability material around the periphery.

At FIG. 39 shows the rotary portion 630 of a large diameter brushless DC electric motor consisting of a central turbofan portion 632, motor shaft 634, and non-magnetizable high permeability material 638 mounted to inside surface 636 in the periphery portion of rotary portion 630 as well as mounting hardware 686, 688, and 690 of FIG. 33. Also employed is electromagnet 580 which is shown in FIG. 33. Electromagnet timing is carried out using the photocell gate shown in FIG. 15 of the original patent application. Amplification of the timing signal from the photocell gate is carried out using the electrical circuitry shown in FIG. 17 of the original patent application.

Figure 40:
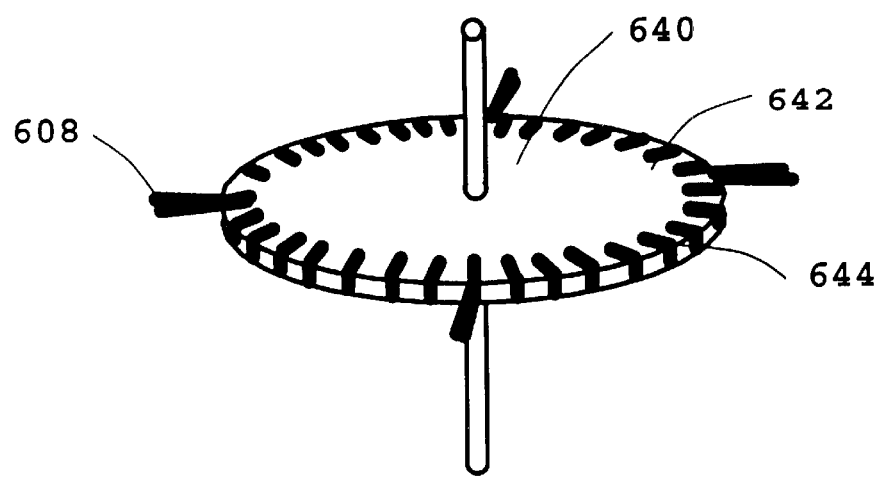
FIG. 40 shows the rotary portion of large diameter brushless DC electric motor consisting of a planar disc having non-magnetizable high permeability material embedded on the outside periphery, along with added air moving surfaces.

FIG. 40 shows the rotary portion 640 of a large diameter brushless DC electric motor consisting of a planar disc 642 having non-magnetizable high permeability material 644 embedded on the outside periphery, along with added air moving surfaces 608. Also employed are electromagnet 614 of FIG. 38, as well as mounting hardware 616, 618, 620, 622, 624, and 626 of FIG. 38. As usual, electromagnet timing is carried out using the photocell gate shown in FIG. 15 of the original patent application. Amplification of the timing signal from the photocell gate is carried out using the electrical circuitry shown in FIG. 17 of the original patent application.

Figure 41:
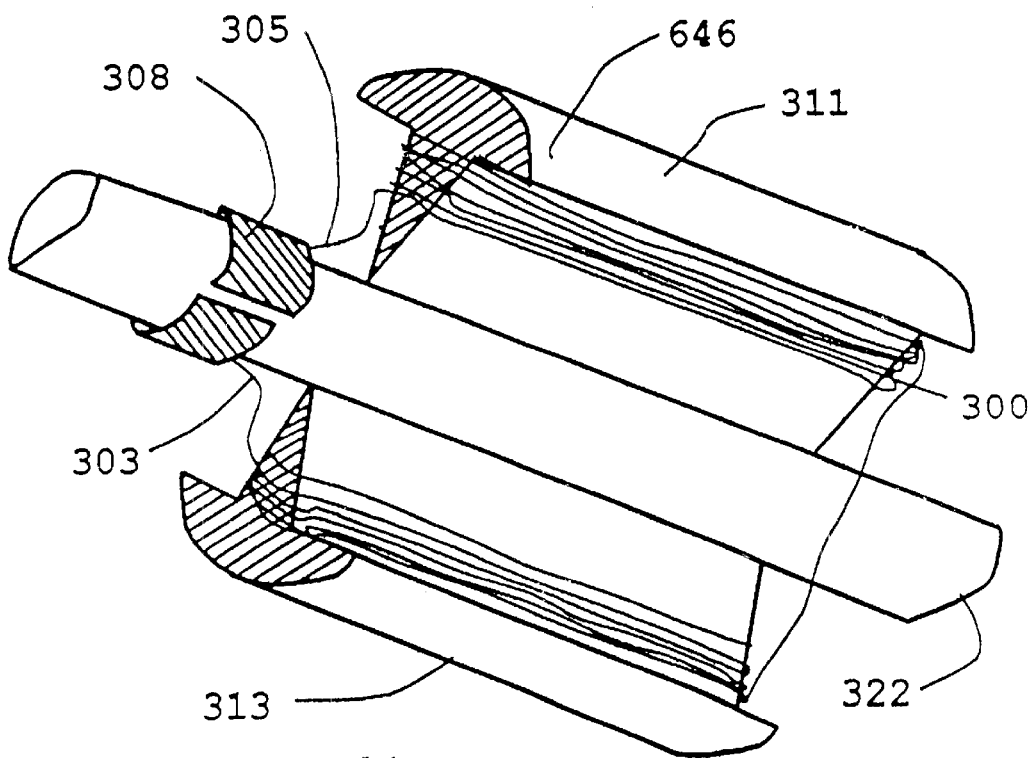
FIG. 41 shows the rotary portion of a traditional brush timed permanent magnet motor employing a single set of electromagnet windings.

FIG. 41 shows the rotary portion of a traditional brushed timed permanent magnet motor. Rotary portion 646 consists of a single set of electromagnet windings 300 along with a commutator 308. Both ends 303 and 305 of electromagnet winder 300 are wired to commutator 308. Commutator 308 is segmented and provides electrical connection between brushes (not shown) and rotor electromagnet windings 300. Also shown is shaft 322. When power is applied to commutator 308, brushes (not shown) provide current to electromagnet windings 300. This produces the needed magnetic field at electromagnet pole faces 311 and 313.

Figure 42:
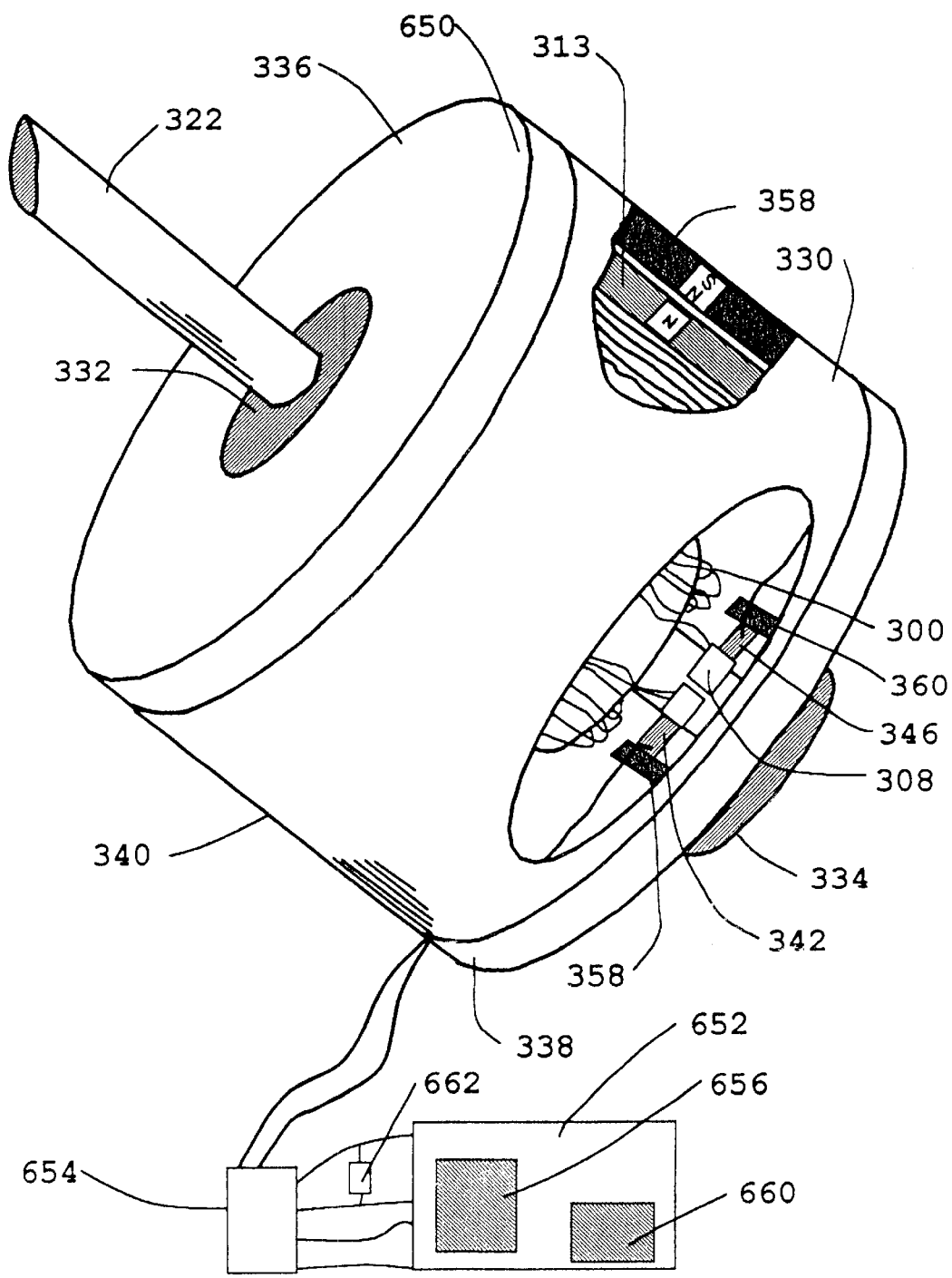
FIG. 42 shows a traditional brush timed permanent magnet motor having a single set of electromagnet windings along with current sensing and interlocking circuitry.

FIG. 42 shows a brush timed permanent magnet motor employing the power supply control aspects of this invention. Permanent magnet motor 650 is shown employing the rotor of FIG. 41 along with DC power supply 652 and current limiting circuitry 654 of FIG. 10. Power supply 652 consists of power control MOSFET transistor 660 and DC power source 656. DC power sources are well known I the art and include batteries, rectified transformers, switching power supplies, DC-DC converters, and other. DC power source 656 is of sufficient power to demagnetize permanent magnets 358 if allowed to deliver full power during motor start up. Power control MOSFET 660 is connected to current limiting circuitry 654. Also shown is diode 662 which is reversed wired across the output power of power supply 652 to reduce back EMF effects from electric motor 650.

Shaft 322 of this motor is rotatably supported by motor bearings 332 and 334 in end caps 336 and 338. End caps 336 and 338 are mounted in motor casing 340 and support bearings 332 and 334. Also shown are brushes 342 and 346, which are supported by brush mounts 358 and 360. Brushes 342 and 346 provide electric power to commutator 308. Also shown is a cut away portion of electric motor 650 showing one of the permanent magnets 358 which is mounted against motor casing 340. Also shown in the cut away portion of this drawing is rotor electromagnet pole face 313.

DC power supply 652 provides enough current and voltage to demagnetize motor permanent magnets 358 if allowed to provide full power during motor start up. Current limiting circuitry 654 (shown in FIG. 10) limits peak currents delivered to motor windings 300 to a level sufficient to prevent demagnetization of permanent magnets 358. At motor start up, power supply 652 provides enough power to electric motor 650 to demagnetize permanent magnets 358. Motor electromagnet windings 300 initially produce a back EMF effect which initially limits the current. As the magnetic field builds in winding 300, the back EMF becomes less and less and the current rises. Once the current reaches a threshold value, current limiting circuitry 654 momentarily shuts off the power. The magnetic field produced by electromagnet windings 300 tapers off, generating a back EMF. Current limiting circuitry 654 then switches power back on to electromagnet windings 300. This on and off power cycling continues until the motor reaches a sufficient speed to reduce motor currents to a preset level which will not demagnetize motor permanent magnets 358

Figure 43:
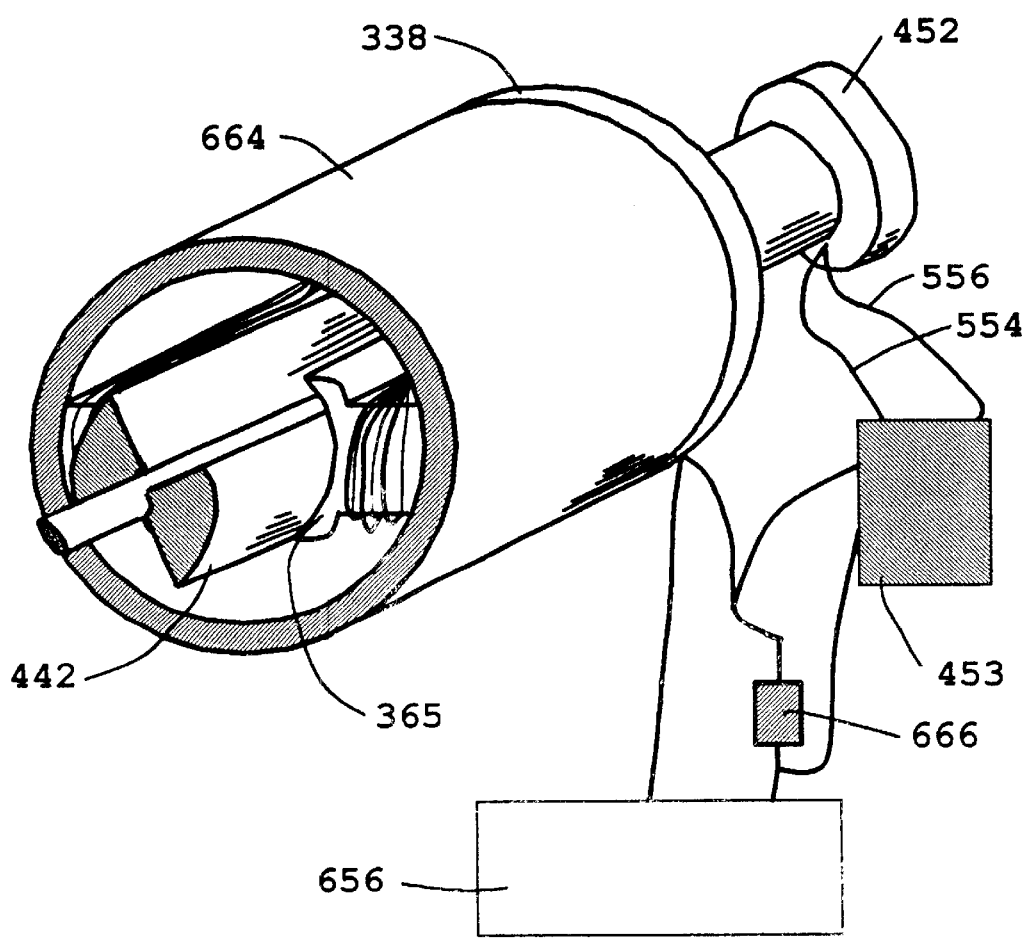
FIG. 43 shows a brushless permanent magnet motor employing current sensing and interlocking circuitry.

FIG. 43 shows a brushless DC permanent magnet motor of this invention employing current limiting circuitry for preventing demagnetization of rotary permanent magnets. Brushless permanent magnet motor 664 is shown having the front end cap removed to expose the inner workings of the motor. This motor is of the standard construction of many brushless DC permanent magnet motors. Rotor 442 of FIG. 30 is shown inside of electromagnet assembly 365. Also shown is end cap 338 and small electric generator 452. Small electric generator 452 puts out a voltage which is proportional to motor RPM values and is used a s part of the current limiting circuitry of this invention. Power output leads 554 and 556 of small electric generator 452 are wired to a relay 453. Relay 453 is chosen so that it will close at the desired RPM value of the motor based on the output voltage of generator 452. Also shown is current limiting resistor 666 in series with DC power source 656. Resistor 666 limits current to a level that will not demagnetize the motor permanent magnets under start up, stall, and low RPM conditions. When rotor 442 reaches a sufficient speed to prevent demagnetization, the output voltage of generator 452 closes relay 453 and shunts resistor 666. This allows full power from DC power source 656 to be delivered directly to motor 664.

Figure 44:
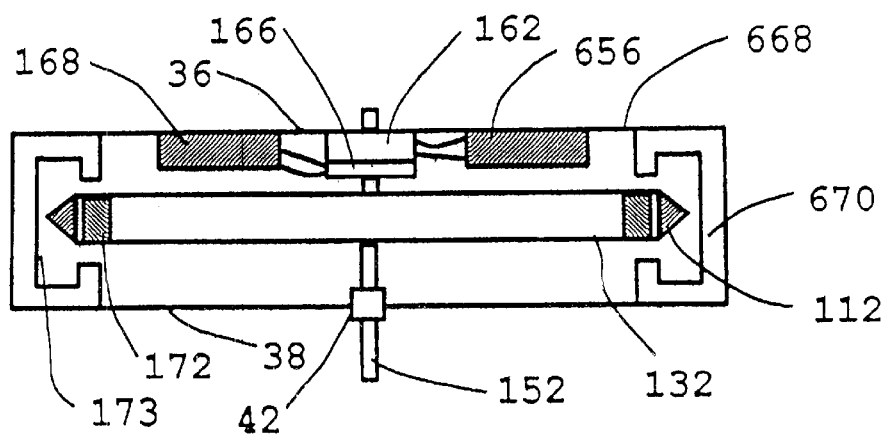
FIG. 44 shows a side view of a high power disc motor of this invention including a small generator on the shaft for speed sensing, speed sensing circuitry, optical timing circuitry, amplification circuitry, and current limiting circuitry.

FIG. 44 shows a side view of the high power disc motor of this invention including a small generator on the shaft for speed sensing, speed sensing circuitry, optical timing circuitry, amplification circuitry, and current limiting circuitry. Disc rotor motor 668 is shown in complete form. This particular motor includes a small electric generator 162 which senses the rotor speed by generating a voltage which is proportions to the speed. Generator 162 is of the permanent magnet type and therefore requires no field windings and therefore no input power. Generator 162 can be wired to a relay to shunt a resistor in the usual manner, or modify input power in other ways as well. Generator 162 of motor 668 is wired to power source 656. Beneath generator 162 of motor 668 is optical encoder 166. Optical encoder 166 is mounted to motor shaft 152. The optical encoder itself is shown in detail in FIGS. 14 and 15 previously described. Optical encoder 166 is wired to amplification circuitry 168 which amplifies the signal from the optical encoder 166 and inputs the amplified signal into C-shaped electromagnets 670. Electromagnets 670 are identical to electromagnets 20 previously described except that electromagnets 670 only require a single set of windings as now the prevention of demagnetization is controlled by limiting the output current of power source 656.

Supported on the motor shaft 152 is rotary disc portion 143 having permanent magnets 54 transversing through the edge of disc 132. The annular edge portion of disc 132 is rotatably disposed within annular channel 173. Also shown are flexible plastic fan blades 112 which provide air currents to cool electromagnets 670. Motor end plates 36 and 38 provide support for motor shaft 152, electromagnets 670, and motor bearings 42. The permanent magnets are disposed on the annular edge portion of disc 132 so that the directions of magnetization thereof transverse through disc 132. In addition, the poles of the permanent magnets are aligned in coupling proximity to the poles of the electromagnets of the stator.

What is claimed is:

1. A brush timed permanent magnet electric motor, comprising:
   a stationary portion including:
      a housing having an inner surface and end caps, and a plurality of permanent magnets each being disposed on said inner surface of said housing, and having a direction of magnetization and poles;
      said poles of said permanent magnets facing inward in a radial direction and alternating with each successive of said permanent magnets;
   a rotatable portion including:
      a shaft rotatably attached to said end caps of said housing;
      and a plurality of electromagnets each being attached to said shaft, having a direction of magnetization and poles, and having a winding capable of conducting current;
      said poles of said electromagnets facing outward in said radial direction and alternating with each successive of said electromagnets;
   position circuitry for sensing a position of said plurality of permanent magnets with respect to said plurality of said electromagnets and for providing a signal based on said position of said plurality of electromagnets to cause said rotatable portion to rotate;
   a power supply;
   said power supply providing sufficient power to said electromagnet windings to demagnetize said permanent magnets at stall conditions; and
   current limiting circuitry that reduces current in said windings to a level sufficient to prevent demagnetization of said permanent magnets.

2. A motor as claimed in claim 1 wherein said current limiting circuitry includes a motor speed sensor.

3. A brushless DC permanent magnet motor comprising:
   a plurality of permanent magnets each attached to said shaft and having a direction of magnetization and poles;
   said poles of said permanent magnets facing outward in a radial direction and alternating with each successive of said permanent magnets;
   a stationary portion including:
      a housing for rotatably supporting said shaft and having an inner surface; and
      a plurality of electromagnets each attached to said inner surface, having a direction of magnetization and poles when electrically energized, and including a winding;
      said poles of said electromagnets facing inward in a radial direction and alternating with each successive of said electromagnets; and
   position circuitry of sensing a position of said plurality permanent magnets with respect to said plurality of said electromagnets and for providing a signal based on said position of said plurality of electromagnets to cause said rotatable portion to rotate; and a power supply;

said power supply providing sufficient power to said electromagnet windings to demagnetize sod permanent magnets at stall conditions; and current limiting circuitry that reduces current in said windings to a level sufficient to prevent demagnetization of said permanent magnets.

4. A motor as claimed in claim 3 wherein said current limiting circuitry includes a motor speed sensor.

5. A direct current (DC) permanent magnet electric motor comprising:

a stationary portion including at least one winding and poles when electrically energized;

a rotatable portion including:
  a shaft rotatable with respect to said stationary portion;
  at least one disc mounted to said shaft, said disc having
    a radial plane including an annular portion rotatably disposed within said stationary portion; and
    a plurality of permanent magnets each having a direction of magnetization and poles, said plurality of permanent magnets being disposed on said annular portion of said disc so that the direction of magnetization is transverse through said disc and so that the poles thereof are aligned in coupling proximity to the poles of said electromagnets;

position circuitry of sensing a position of said plurality of permanent magnets with respect to said plurality of electromagnets and for providing a signal based on said position to said at least on of said electromagnets to cause said rotatable portion to rotate;

each of said at least one of said electromagnets having poles facing perpendicular to said radial plane of said annular portion of said disc; and a power supply;

said power supply providing sufficient power to said electromagnet winding to demagnetize said permanent magnets at stall conditions; and current limiting circuitry that reduces current in said windings to a level sufficient to prevent demagnetization of said permanent magnets.

6. A motor as claimed in claim 5 wherein said current limiting circuitry includes a speed sensor.

* * * * *